US012738196B2

(12) United States Patent
Kawashima et al.

(10) Patent No.: US 12,738,196 B2
(45) Date of Patent: Sep. 15, 2026

(54) DISPLAY DEVICE AND ELECTRONIC DEVICE

(71) Applicant: Semiconductor Energy Laboratory Co., Ltd., Atsugi (JP)

(72) Inventors: Susumu Kawashima, Atsugi (JP); Koji Kusunoki, Isehara (JP); Tomoaki Atsumi, Hadano (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 18/701,699

(22) PCT Filed: Oct. 24, 2022

(86) PCT No.: PCT/IB2022/060179
§ 371 (c)(1),
(2) Date: Apr. 16, 2024

(87) PCT Pub. No.: WO2023/079404
PCT Pub. Date: May 11, 2023

(65) Prior Publication Data
US 2024/0420626 A1 Dec. 19, 2024

(30) Foreign Application Priority Data
Nov. 5, 2021 (JP) ................................ 2021-181059

(51) Int. Cl.
*G09G 3/32* (2016.01)

(52) U.S. Cl.
CPC ......... *G09G 3/32* (2013.01); *G09G 2310/066* (2013.01); *G09G 2310/08* (2013.01);
(Continued)

(58) Field of Classification Search
CPC ......... G09G 3/20; G09G 3/2003–2014; G09G 3/32–3291; G09G 2300/0421;
(Continued)

(56) References Cited

U.S. PATENT DOCUMENTS 5,953,985 A 9/1999 Kobayashi
6,120,338 A 9/2000 Hirano et al.
(Continued)

FOREIGN PATENT DOCUMENTS

CN 001409289 A 4/2003
CN 001417767 A 5/2003
(Continued)

OTHER PUBLICATIONS

International Search Report (Application No. PCT/IB2022/060179) Dated Jan. 10, 2023.
(Continued)

*Primary Examiner* — Nathan Danielsen
(74) *Attorney, Agent, or Firm* — Eric J. Robinson; Robinson Intellectual Property Law Office, P.C.

(57) ABSTRACT

A display device whose change in chromaticity is small and grayscale controllability is high is provided. Light emission of the light-emitting device can be performed by PAM and PWM control (a pulse width control involving changes in amplitude), so that the amount of change in chromaticity can be reduced and the controllability on the low grayscale side can be increased. The display device includes a pulse-signal-generation portion and a light-emitting control portion in a pixel and is capable of charging a signal potential in the light-emitting control portion and then discharging the signal potential in accordance with a pulse signal generated in the pulse-signal-generation portion. Thus, the light-emitting device can emit light in a desired period with desired emission intensity.

13 Claims, 22 Drawing Sheets

10a

(52) U.S. Cl.
CPC .............. *G09G 2320/0242* (2013.01); *G09G 2320/0633* (2013.01); *G09G 2330/023* (2013.01)

(58) Field of Classification Search
CPC ... G09G 2300/0426; G09G 2300/0809; G09G 2300/0833; G09G 2300/0852; G09G 2300/0861; G09G 2310/0243; G09G 2310/06; G09G 2310/066; G09G 2310/08; G09G 2320/0242; G09G 2320/0626-064; G09G 2330/023
See application file for complete search history.

(56) References Cited

U.S. PATENT DOCUMENTS

| | | | | |
|---|---|---|---|---|
| 6,909,242 | B2 | 6/2005 | Kimura | |
| 7,583,032 | B2 | 9/2009 | Kimura | |
| 7,915,830 | B2 | 3/2011 | Kimura | |
| 8,378,578 | B2 | 2/2013 | Kimura | |
| 8,604,704 | B2 | 12/2013 | Kimura | |
| 9,437,831 | B2 | 9/2016 | Yamazaki et al. | |
| 9,559,316 | B2 | 1/2017 | Yamazaki et al. | |
| 9,559,317 | B2 | 1/2017 | Yamazaki et al. | |
| 10,312,315 | B2 | 6/2019 | Yamazaki et al. | |
| 10,355,067 | B2 | 7/2019 | Yamazaki et al. | |
| 10,763,322 | B2 | 9/2020 | Yamazaki et al. | |
| 10,854,697 | B2 | 12/2020 | Yamazaki et al. | |
| 10,872,947 | B2 | 12/2020 | Yamazaki et al. | |
| 10,879,331 | B2 | 12/2020 | Yamazaki et al. | |
| 11,004,925 | B2 | 5/2021 | Yamazaki et al. | |
| 11,257,423 | B2 | 2/2022 | Liu et al. | |
| 11,672,148 | B2 | 6/2023 | Yamazaki et al. | |
| 11,823,614 | B2 | 11/2023 | Watanabe et al. | |
| 12,048,207 | B2 | 7/2024 | Yamazaki et al. | |
| 2002/0072139 | A1 | 6/2002 | Kashiwabara | |
| 2003/0058687 | A1 | 3/2003 | Kimura | |
| 2003/0103022 | A1 | 6/2003 | Noguchi et al. | |
| 2007/0072439 | A1 | 3/2007 | Akimoto et al. | |
| 2011/0050761 | A1 | 3/2011 | Yoneyama | |
| 2011/0089417 | A1 | 4/2011 | Yamazaki et al. | |
| 2011/0101351 | A1 | 5/2011 | Yamazaki | |
| 2011/0122670 | A1 | 5/2011 | Yamazaki et al. | |
| 2011/0148290 | A1 | 6/2011 | Oota | |
| 2012/0161220 | A1 | 6/2012 | Yamazaki | |
| 2012/0256204 | A1 | 10/2012 | Yoshizumi et al. | |
| 2012/0273804 | A1 | 11/2012 | Hatano | |
| 2012/0276484 | A1 | 11/2012 | Izumi et al. | |
| 2013/0084531 | A1 | 4/2013 | Hamaguchi et al. | |
| 2013/0084664 | A1 | 4/2013 | Yoshitoku et al. | |
| 2013/0084666 | A1 | 4/2013 | Oshige | |
| 2013/0221356 | A1 | 8/2013 | Yamazaki et al. | |
| 2013/0280839 | A1 | 10/2013 | Sonoda et al. | |
| 2013/0295705 | A1 | 11/2013 | Sonoda et al. | |
| 2014/0004640 | A1 | 1/2014 | Hamaguchi et al. | |
| 2014/0004642 | A1 | 1/2014 | Otsuka et al. | |
| 2014/0367705 | A1 | 12/2014 | Bibl et al. | |
| 2015/0060826 | A1 | 3/2015 | Matsumoto et al. | |
| 2015/0069360 | A1 | 3/2015 | Sato | |
| 2015/0076476 | A1 | 3/2015 | Odaka et al. | |
| 2016/0155423 | A1* | 6/2016 | Shin | G09G 3/20 345/520 |
| 2016/0172595 | A1 | 6/2016 | Malinowski et al. | |
| 2016/0315133 | A1 | 10/2016 | Sato | |
| 2017/0039935 | A1 | 2/2017 | Yang. et al. | |
| 2017/0141167 | A1 | 5/2017 | Naganuma | |
| 2017/0256754 | A1 | 9/2017 | Defranco et al. | |
| 2017/0271338 | A1 | 9/2017 | Yamazaki et al. | |
| 2018/0061915 | A1* | 3/2018 | Yu | G09G 3/3258 |
| 2018/0151125 | A1* | 5/2018 | Lee | G09G 3/3266 |
| 2018/0190908 | A1 | 7/2018 | Ke et al. | |
| 2018/0293929 | A1 | 10/2018 | Shigeta et al. | |
| 2018/0301080 | A1 | 10/2018 | Shigeta et al. | |
| 2019/0051759 | A1 | 2/2019 | Akimoto et al. | |
| 2019/0371231 | A1 | 12/2019 | Kim et al. | |
| 2020/0203662 | A1 | 6/2020 | Mollard et al. | |
| 2021/0065616 | A1 | 3/2021 | Kim et al. | |
| 2021/0158748 | A1* | 5/2021 | Kawae | G09G 3/32 |
| 2021/0225942 | A1 | 7/2021 | Suzuki et al. | |
| 2021/0234112 | A1 | 7/2021 | Seo et al. | |
| 2021/0296543 | A1 | 9/2021 | Aoyama et al. | |
| 2021/0407380 | A1 | 12/2021 | Liu et al. | |
| 2023/0290301 | A1 | 9/2023 | Watanabe et al. | |

FOREIGN PATENT DOCUMENTS

| | | | |
|---|---|---|---|
| CN | 102005170 | A | 4/2011 |
| CN | 108694908 | A | 10/2018 |
| CN | 108735143 | A | 11/2018 |
| CN | 110556072 | A | 12/2019 |
| CN | 112447131 | A | 3/2021 |
| CN | 112767874 | A | 5/2021 |
| EP | 1296310 | A | 3/2003 |
| EP | 2290642 | A | 3/2011 |
| EP | 3389037 | A | 10/2018 |
| EP | 3389039 | A | 10/2018 |
| JP | 2000-036385 | A | 2/2000 |
| JP | 2003-059663 | A | 2/2003 |
| JP | 2003-208127 | A | 7/2003 |
| JP | 2004-054203 | A | 2/2004 |
| JP | 2007-096055 | A | 4/2007 |
| JP | 2007-123861 | A | 5/2007 |
| JP | 2008-098106 | A | 4/2008 |
| JP | 2008-147072 | A | 6/2008 |
| JP | 2008-251270 | A | 10/2008 |
| JP | 2011-048101 | A | 3/2011 |
| JP | 2014-120218 | A | 6/2014 |
| JP | 2014-135251 | A | 7/2014 |
| JP | 2014-232568 | A | 12/2014 |
| JP | 2015-115178 | A | 6/2015 |
| JP | 2016-197494 | A | 11/2016 |
| JP | 2019-179696 | A | 10/2019 |
| JP | 2020-160305 | A | 10/2020 |
| JP | 2021-085894 | A | 6/2021 |
| KR | 2003-0025873 | A | 3/2003 |
| KR | 2003-0038522 | A | 5/2003 |
| KR | 2018-0114816 | A | 10/2018 |
| KR | 2018-0115615 | A | 10/2018 |
| KR | 2019-0136882 | A | 12/2019 |
| KR | 2021-0027672 | A | 3/2021 |
| TW | 201824602 | | 7/2018 |
| WO | WO-2015/083029 | | 6/2015 |
| WO | WO-2018/190503 | | 10/2018 |
| WO | WO-2018/190669 | | 10/2018 |
| WO | WO-2019/220275 | | 11/2019 |
| WO | WO-2019/231073 | | 12/2019 |
| WO | WO-2020/016346 | | 1/2020 |
| WO | WO-2021/082840 | | 5/2021 |

OTHER PUBLICATIONS

Written Opinion (Application No. PCT/IB2022/060179) Dated Jan. 10, 2023.

Zakhidov.A et al., "Orthogonal processing: A new strategy for organic electronics", Chem. Sci. (Chemical Science), Apr. 7, 2011, vol. 2, No. 6, pp. 1178-1182.

Malinowski.P et al., "High resolution photolithography for direct view active matrix organic light-emitting diode augmented reality displays", J. Soc. Inf. Display (Journal of the Society for Information Display), Apr. 2, 2018, vol. 26, No. 3, pp. 128-136.

Malinowski.P et al., "Photolithographic patterning of organic photodetectors with a non-fluorinated photoresist system", Organic Electronics, Jul. 12, 2014, vol. 15, No. 10, pp. 2355-2359.

Malinowski.P et al., "Multicolor 1250 ppi OLED Arrays Patterened by Photolithography", SID Digest '16 : SID International Symposium Digest of Technical Papers, May 22, 2016, vol. 47, No. 1, pp. 1009-1012.

Papadopoulos.N et al., "AMOLED Displays with In-Pixel Photodetector", Liquid Crystals and Display Technology, Jul. 9, 2020, pp. 1-19.

Ke.T et al., "Technology Developments in High-Resolution FMM-free OLED and BEOL IGZO TFTs for Power-Efficient Microdisplays",

(56) References Cited

OTHER PUBLICATIONS

SID Digest '21 : SID International Symposium Digest of Technical Papers, May 1, 2021, vol. 52, No. 1, pp. 127-130.
Malinowski.P et al., "Integration of additional functionalities into the frontplane of AMOLED displays", SID Digest '20 : SID International Symposium Digest of Technical Papers, Aug. 1, 2020, vol. 51, No. 1, pp. 646-649.
Malinowski.P et al., "Organic photolithography for displays with integrated fingerprint scanner", SID Digest '19 : SID International Symposium Digest of Technical Papers, May 29, 2019, vol. 50, No. 1, pp. 1007-1010.
Ke.T et al., "Island and Hole Fabrication on OLED Stack for High-Resolution Sensor in Display Application", IDW '20 : Proceedings of the 27th International Display Workshops, Dec 9, 2020, vol. 27, pp. 902-905.
Gather.M et al., "Solution-Processed Full-Color Polymer-OLED Displays Fabricated by Direct Photolithography", SID Digest '06 : SID International Symposium Digest of Technical Papers, Jun. 1, 2006, vol. 37, No. 1, pp. 909-911.
Malinowski.P et al., "Photolithography as Enabler of AMOLED Displays Beyond 1000 ppi", SID Digest '17 : SID International Symposium Digest of Technical Papers, May 1, 2017, vol. 48, No. 1, pp. 623-626.
Tamaki.M et al., "LTPS TFT Full Color MicroLED Display with Redundant Pixel Design and Covering Micro-Reflector Array", SID Digest '21 : SID International Symposium Digest of Technical Papers, May 17, 2021, pp. 29-32.
Hong.Y et al., "A Novel Micro-LED Pixel Circuit Using n-type LTPS TFT with Pulse Width Modulation Driving", SID Digest '21 : SID International Symposium Digest of Technical Papers, May 17, 2021, pp. 868-871.
Taiwanese Office Action (Application No. 111139605) Dated Mar. 16, 2026.

* cited by examiner

DISPLAY DEVICE AND ELECTRONIC DEVICE

TECHNICAL FIELD

One embodiment of the present invention relates to a display device.

Note that one embodiment of the present invention is not limited to the above technical field. The technical field of one embodiment of the invention disclosed in this specification and the like relates to an object, a method, or a manufacturing method. Alternatively, one embodiment of the present invention relates to a process, a machine, manufacture, or a composition of matter. As a more specific example of the technical field of one embodiment of the present invention disclosed in this specification, a semiconductor device, a display device, a liquid crystal display device, a light-emitting device, a lighting device, a power storage device, a memory device, an imaging device, an operation method thereof, or a manufacturing method thereof can be given.

Note that in this specification and the like, a semiconductor device generally means a device that can function by utilizing semiconductor characteristics. A transistor and a semiconductor circuit are embodiments of semiconductor devices. In addition, in some cases, a memory device, a display device, an imaging device, or an electronic device includes a semiconductor device.

BACKGROUND ART

A display device and a lighting device including a micro light-emitting diode (hereinafter, referred to as a micro LED (LED: Light Emitting Diode)) have been proposed (e.g., Patent Document 1). A display device including a micro LED is capable of displaying with high luminance and has high reliability, and thus is a promising next-generation display.

A technique for forming transistors using a metal oxide formed over a substrate has been attracting attention. For example, Patent Document 2 and Patent Document 3 each disclose a technique in which a transistor formed using zinc oxide or an In—Ga—Zn-based oxide is used as a switching element or the like of a pixel in a display device.

REFERENCE

Patent Document

[Patent Document 1] Specification of United States Patent Application Publication No. 2014/0367705

[Patent Document 2] Japanese Published Patent Application No. 2007-123861

[Patent Document 3] Japanese Published Patent Application No. 2007-96055

SUMMARY OF THE INVENTION

Problems to be Solved by the Invention

In a display device using a light-emitting device (also referred to as a light-emitting element), luminance can be changed by controlling current flowing through the light-emitting device. However, the characteristic of an LED that is one of light-emitting devices is that the chromaticity is likely to change in accordance with the current density.

Thus, when luminance of the LED is controlled by pulse amplitude modulation (PAM), color reproducibility might be poor. Accordingly, driving of the LED is preferably controlled by pulse width modulation (PWM) in which luminance is controlled by a duty ratio. With the use of PWM control, the current density can be constant; thus, luminance can be controlled without occurrence of chromaticity variation.

On the other hand, because of response characteristics of the LED and a transistor for driving the LED, there is a lower limit for the duty ratio capable of being controlled stably. Therefore, PWM control of the LED has a problem that it is difficult to control the duty ratio at a low grayscale side where the duty ratio is small.

Therefore, one object of one embodiment of the present invention is to provide a display device whose change in chromaticity is small and grayscale controllability is high. Another object is to provide a display device including a pixel circuit for generating a pulse signal. Another object is to provide a display device including a pixel circuit capable of performing PAM control and PWM control. Another object is to provide a display device having excellent display characteristics. Another object is to provide a display device with a narrow bezel.

Another object is to provide a display device with low power consumption. Another object is to provide a highly reliable display device. Another object is to provide a novel display device or the like. Another object is to provide a method for operating the display device. Another object is to provide a novel semiconductor device or the like.

Note that the description of these objects does not preclude the existence of other objects. Note that one embodiment of the present invention does not need to achieve all the objects. Note that other objects will be apparent from the description of the specification, the drawings, the claims, and the like, and other objects can be derived from the description of the specification, the drawings, the claims, and the like.

Means for Solving the Problems

One embodiment of the present invention relates to a display device including a pixel circuit capable of performing PAM control and PWM control.

A first embodiment of the present invention is a display device including a pulse-signal-generation portion and a light-emitting control portion in a pixel. The light-emitting control portion includes a light-emitting device. The light-emitting device emits light in accordance with a data potential charged in the light-emitting control portion. The data potential is discharged in accordance with a pulse signal generated in the pulse-signal-generation portion, whereby the light-emitting device is turned off.

A second embodiment of the present invention is a display device including a pulse-signal-generation portion, a first transistor, a second transistor, a third transistor, and a light-emitting device in a pixel. A gate of the first transistor is electrically connected to one of a source and a drain of the second transistor and one of a source and a drain of the third transistor. One of a source and a drain of the first transistor is electrically connected to one electrode of the light-emitting device. A gate of the third transistor is electrically connected to the pulse-signal-generation portion. A first data potential is charged in the gate of the first transistor through the second transistor, whereby the light-emitting device emits light. The third transistor is turned on in accordance with a pulse signal generated in the pulse-signal-generation portion. The first data potential charged in the gate of the first transistor is discharged, whereby the light-emitting device is turned off.

The pulse-signal-generation portion includes a fourth transistor, a fifth transistor, and a sixth transistor. One of a source and a drain of the fourth transistor can be electrically connected to one of a source and a drain of the fifth transistor and the gate of the third transistor. A gate of the fourth transistor can be electrically connected to one of a source and a drain of the sixth transistor.

A slope-shaped signal potential can be input to the fourth transistor. A reset potential can be input to the fifth transistor. A second data potential can be input to the sixth transistor.

A third embodiment of the present invention is a display device including a first to sixth transistors, a first capacitor, a second capacitor, and a light-emitting device. A gate of the first transistor is electrically connected to one of a source and a drain of the second transistor, one of a source and a drain of the third transistor, and one electrode of the first capacitor. One of a source and a drain of the first transistor is electrically connected to one electrode of the light-emitting device and the other electrode of the first capacitor. A gate of the third transistor is electrically connected to one of a source and a drain of the fourth transistor and one of a source and a drain of the fifth transistor. A gate of the fourth transistor is electrically connected to one of a source and a drain of the sixth transistor and one electrode of the second capacitor.

In the second and the third embodiments of the present invention, a seventh transistor may be provided, and one of a source and a drain of the seventh transistor may be electrically connected to one of the source and the drain of the first transistor.

Each of the first to third transistors, the fifth transistor, and the sixth transistor can be an n-channel transistor, and the fourth transistor can be a p-channel transistor.

In that case, each of the first transistor, the second transistor, the fifth transistor, and the sixth transistor preferably includes a metal oxide in a channel formation region and each of the third transistor and the fourth transistor include silicon in a channel formation region.

Alternatively, each of the second transistor, the fourth transistor, and the sixth transistor is an n-channel transistor, and each of the first transistor, the third transistor, and the fifth transistor may be a p-channel transistor.

In that case, each of the second transistor, the fourth transistor, and the sixth transistor preferably includes a metal oxide in a channel formation region and each of the first transistor, the third transistor, and the fifth transistor preferably includes silicon in the channel formation region.

The light-emitting device is preferably a mini LED or a micro LED.

Effect of the Invention

With one embodiment of the present invention, a display device whose change in chromaticity is small and grayscale controllability is high can be provided. Alternatively, a display device including a pixel circuit for generating a pulse-signal can be provided. Alternatively, a display device including a pixel circuit capable of performing PAM control and PWM control can be provided. Alternatively, a display device with excellent display characteristics can be provided. Alternatively, a display device with a narrow bezel can be provided.

Alternatively, a display device with low power consumption can be provided.

Alternatively, a highly reliable display device can be provided. Alternatively, a novel display device or the like can be provided. Alternatively, a method for operating the display device can be provided. Alternatively, a novel semiconductor device or the like can be provided.

MODE FOR CARRYING OUT THE INVENTION

Figure 1:
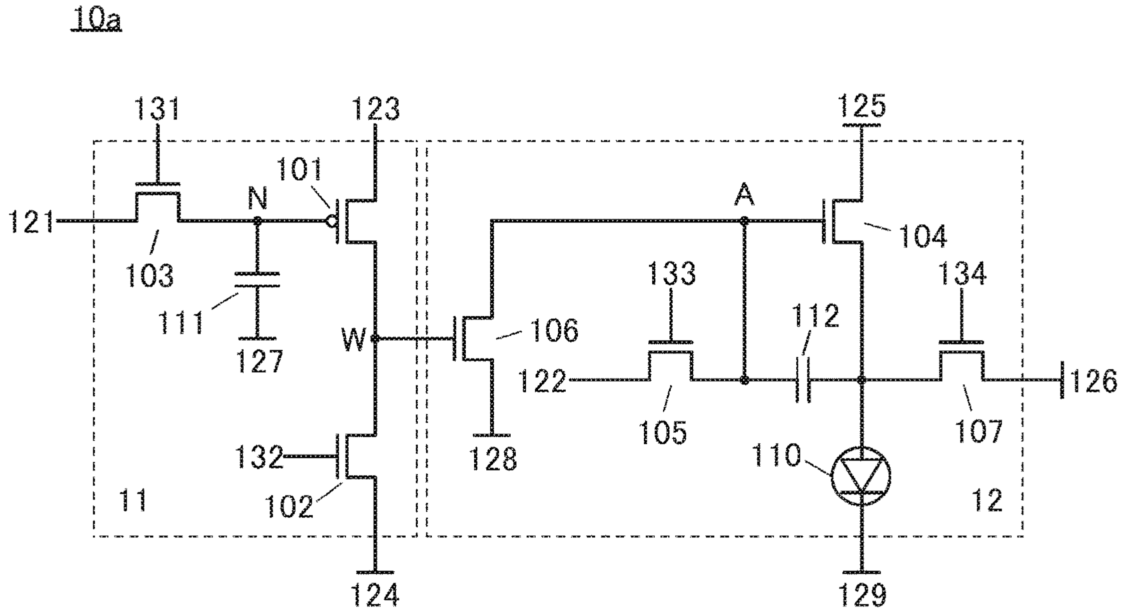
FIG. 1 is a diagram illustrating a pixel circuit.

Embodiments will be described in detail with reference to drawings. Note that the present invention is not limited to the following description, and it will be readily understood by those skilled in the art that modes and details of the present invention can be modified in various ways without departing from the spirit and scope of the present invention. Therefore, the present invention should not be construed as being limited to the description of embodiments below. Note that in structures of the invention described below, the same reference numerals are used in common, in different drawings, for the same portions or portions having similar functions, and a repeated description thereof is omitted in some cases. Note that the hatching of the same component that constitutes a drawing is sometimes omitted or changed as appropriate in different drawings.

In addition, even in the case where a single component is illustrated in a circuit diagram, the component may be composed of a plurality of parts as long as there is no functional inconvenience. For example, in some cases, a plurality of transistors that each operate as a switch are connected in series or in parallel. Furthermore, in some cases, capacitors are divided and arranged in a plurality of positions.

In addition, one conductor has a plurality of functions of a wiring, an electrode, a terminal, and the like in some cases. In this specification, a plurality of names are used for the same component in some cases. Furthermore, even in the case where elements are illustrated in a circuit diagram as if they were directly connected to each other, the elements may actually be connected to each other through one conductor or a plurality of conductors. In this specification, even such a structure is included in the category of direct connection.

Embodiment 1

In this embodiment, a display device according to one embodiment of the present invention is described with reference to drawings.

One embodiment of the present invention is a display device capable of performing light emission of a light-emitting device by PAM+PWM control (a pulse width control involving changes in amplitude). In the display device, a pulse-signal-generation portion and a light-emitting control portion are provided in a pixel, and a signal potential can be charged in the light-emitting control portion and subsequently discharged in accordance with a pulse-signal generated in the pulse-signal-generation portion. Therefore, the light-emitting device can emit light in a desired period with a desired emission intensity.

Note that in this embodiment, PAM control means controlling luminance by changing a emission intensity (corresponding to current flowing through the light-emitting device) with a light-emitting time kept constant (corresponding to a width of the pulse-signal generated in the pixel). PWM control means controlling luminance by changing the light-emitting time with an emission intensity kept constant.

LED, one of the light-emitting devices, has characteristics that the chromaticity changes depending on the current density, and PAM control is not suitable in some cases. On the other hand, PWM control has a problem in that control at a low grayscale is not easy due to the influence of response characteristics or the like of a driving transistor and the LED. In order to relieve these problems, a display operation in which PWM control and PAM control are combined can be performed in the display device of one embodiment of the present invention.

For example, the display operation can be performed by PAM control at a low grayscale side and a high grayscale side and PWM control at an intermediate grayscale. Through the operation, it is possible to increase controllability at the low grayscale side while the amount of change in chromaticity is reduced. Note that the display device of one embodiment of the present invention is not limited thereto, and a light-emitting operation of the LED can be performed only by either PAM control or PWM control over a wide gray level.

<Structure Example 1>

FIG. 1 is a circuit diagram of a pixel 10*a* included in a display device according to one embodiment of the present invention. The pixel 10*a* can be divided roughly into a pulse-signal-generation portion 11 and a light-emitting control portion 12.

The pulse-signal-generation portion 11 can include a transistor 101, a transistor 102, a transistor 103, and a capacitor 111. Here, the transistor 101 can be a p-channel transistor. Although FIG. 1 illustrates an example in which n-channel transistors are used as the other transistors, transistors functioning as switches may be p-channel transistors.

The light-emitting control portion 12 includes a transistor 104, a transistor 105, a transistor 106, a transistor 107, a capacitor 112, and a light-emitting device 110. Although FIG. 1 illustrates an example in which n-channel transistors are used as the transistors 104 to 107, such transistors functioning as switches may be p-channel transistors. Although an LED (e.g., a micro LED or a mini LED) is preferably used as the light-emitting device 110, an organic EL element may also be used.

In the pulse-signal-generation portion 11, one of a source and a drain of the transistor 101 is electrically connected to one of a source and a drain of the transistor 102 and a gate of the transistor 106 which is included in the light-emitting control portion 12. A gate of the transistor 101 is electrically connected to one electrode of the capacitor 111 and one of a source and a drain of the transistor 103.

Here, a point (a wiring or an electrode) where the gate of the transistor 101, the one electrode of the capacitor 111, and the one of the source and the drain of the transistor 103 are connected to each other is referred to as a node N. A point (a wiring or an electrode) where the one of the source and the drain of the transistor 101, the one of the source and the drain of the transistor 102, and the gate of the transistor 106 are connected to each other is referred to as a node W.

In the light-emitting control portion 12, a gate of the transistor 104 is electrically connected to one of a source and a drain of the transistor 105, one electrode of the capacitor 112, and one of a source and a drain of the transistor 106. One of a source and a drain of the transistor 104 is electrically connected to one of a source and a drain of the transistor 107, the other electrode of the capacitor 112, and one electrode (anode) of the light-emitting device 110.

Here, a point (a wiring or an electrode) where the gate of the transistor 104, the one of the source and the drain of the transistor 105, the one electrode of the capacitor 112, and the one of the source and the drain of the transistor 106 are connected to each other is referred to as a node A.

The connection relations between the transistors and wirings are as follows. The other of the source and the drain of the transistor 101 is electrically connected to a wiring 123. The other of the source and the drain of the transistor 102 is electrically connected to a wiring 124. The other of the source and the drain of the transistor 103 is electrically connected to a wiring 121. The other of the source and the drain of the transistor 104 is electrically connected to a wiring 125. The other of the source and the drain of the transistor 105 is electrically connected to a wiring 122. The other of the source and the drain of the transistor 106 is electrically connected to a wiring 128. The other of the source and the drain of the transistor 107 is electrically connected to a wiring 126. The other electrode of the capacitor 111 is electrically connected to a wiring 127. The other electrode (cathode) of the light-emitting device 110 is electrically connected to a wiring 129. A gate of the transistor 102 is electrically connected to a wiring 132. A gate of the transistor 103 is electrically connected to a wiring 131. A gate of the transistor 105 is electrically connected to a wiring 133. A gate of the transistor 107 is electrically connected to a wiring 134.

The wirings 121, 123, and 124 are wirings for supplying signal potentials for PWM control. The wiring 121 is a first source line for supplying a signal potential for determining a pulse width and can be electrically connected to a first source driver. The wiring 123 is a wiring for supplying a slope signal and can be electrically connected to the slope potential generation circuit. The wiring 124 is a wiring for supplying a reset potential to the node W.

Note that in this specification, the slope potential is a type of ramp wave and refers to a slope-shaped signal potential that changes a potential from high to low or from low to high.

The wiring 122 is a wiring for supplying a signal potential for PAM control. The wiring 122 is a second source line for supplying a signal potential for determining an amplitude (voltage) and can be electrically connected to a second source driver.

The wirings 131 to 134 are gate lines for controlling conduction or non-conduction of the transistors and can be electrically connected to gate drivers. The wirings 131 to 134 may be common wirings. The wirings 125 and 129 are power supply lines. The wiring 125 can be a high-potential power supply line and the wiring 129 can be a low potential power supply line. The wiring 126 is a wiring for supplying a reset potential for fixing a source potential of the transistor 104. The wiring 128 is a fixed potential line and can be a wiring for supplying a potential lower than the lowest signal potential supplied from the wiring 122. The wiring 127 is a fixed potential line and can be a low-potential wiring, for example. Any one of the wirings 124, 126, 127, 128, and 129 may be used in common with one or more of the other wirings.

Here, the transistors 102, 103, 105, and 107 function as switches. The transistors 101 and 106 have a function of generating a pulse-signal. The transistor 104 functions as a driving transistor of the light-emitting device 110 and performs a switching operation in accordance with the generated pulse-signal. Note that the amplitude of the pulse-signal is variable in accordance with the signal potential input from the wiring 122. The capacitors 111 and 112 function as storage capacitors.

As the transistors 101 to 107, a transistor including silicon in a channel formation region (hereinafter, referred to as a Si transistor), a transistor including a metal oxide in a channel formation region (hereinafter, referred to as an OS transistor), or the like can be used. Both the Si transistor and the OS transistor can also be used.

For example, in a circuit structure illustrated in FIG. 1, the Si transistors are preferably used as the transistors 101 and 106, and the OS transistors are preferably used as the other transistors. The OS transistor can be provided in a step for providing a wiring layer over the Si transistor, whereby the degree of integration can be increased.

Since the transistor 101 is a p-channel transistor, the transistor 101 can be easily formed using the Si transistor. In addition, since the transistor 106 preferably has fast charge and discharge characteristics, the transistor 106 preferably has high mutual conductance (gm). The Si transistor has relatively high mobility and thus can be a transistor having high gm. Note that the OS transistor may be used as the transistor 106.

An OS transistor has more favorable drain current saturation characteristics than a Si transistor even when the OS transistor has a short channel length, and thus is suitably used as the driving transistor (the transistor 104) of the light-emitting device 110.

Furthermore, since a semiconductor layer included in an OS transistor has a large energy gap, the OS transistor can have an extremely low off-state current of several yA/μm (current value per micrometer of a channel width). Owing to a low off-state current, the potential retention capability of the node can be increased; thus, an appropriate image display can be performed even when the frame frequency is decreased. For example, switching between a first frame frequency (for example, higher than or equal to 60 Hz) in moving image display and a second frame frequency that is lower than the first frame frequency (for example, approximately 1 to 10 Hz) in still image display can reduce power consumption of the display device.

As a semiconductor material used for an OS transistor, a metal oxide whose energy gap is greater than or equal to 2 eV, preferably greater than or equal to 2.5 eV, further preferably greater than or equal to 3 eV can be used. A typical example is an oxide semiconductor containing indium, and a CAAC-OS, a CAC-OS, or the like described later can be used, for example. A CAAC-OS has a crystal structure of stable atoms and is suitable for a transistor or the like whose reliability is important. In addition, a CAC-OS exhibits excellent mobility characteristics and thus is suitable for a transistor or the like that is driven at high speed.

Unlike a transistor including silicon in a channel formation region (hereinafter, a Si transistor), an OS transistor has characteristics that impact ionization, an avalanche breakdown, a short-channel effect, and the like do not occur, and thus a highly reliable circuit can be formed.

A semiconductor layer included in an OS transistor can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium). The In-M-Zn-based oxide can be typically formed by a sputtering method. Alternatively, the In-M-Zn-based oxide can be formed by an ALD (Atomic layer deposition) method.

The atomic ratio of metal elements in a sputtering target used to form the In-M-Zn-based oxide by a sputtering method preferably satisfies In≥M and Zn≥ M. The atomic ratio of metal elements of such a sputtering target is preferably In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, In:M:Zn=5:1:8, or the like. Note that the atomic ratio in the deposited semiconductor layer varies from the atomic ratio of metal elements contained in the sputtering target in a range of ±40%.

An oxide semiconductor with a low carrier concentration is used for the semiconductor layer. For example, an oxide semiconductor which has a carrier concentration lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, yet further preferably lower than $1\times10^{10}/cm^3$, and higher than or equal to $1\times10^{9}/cm^3$ can be used for the semiconductor layer. Such an oxide semiconductor is referred to as a highly purified intrinsic or substantially highly purified intrinsic oxide semiconductor. The oxide semiconductor has low density of defect states and can be referred to as an oxide semiconductor having stable characteristics.

Note that the composition is not limited thereto, and an oxide semiconductor having appropriate composition may be used depending on required semiconductor characteristics and electrical characteristics of the transistor (field-effect mobility, threshold voltage, and the like). In addition, to obtain the required semiconductor characteristics of the transistor, it is preferable that the carrier concentration, impurity concentration, defect density, atomic ratio between a metal element and oxygen, interatomic distance, density, and the like of the semiconductor layer be appropriately set.

When silicon or carbon, which is one of the Group 14 elements, is contained in the oxide semiconductor included in the semiconductor layer, oxygen vacancies are increased, and the semiconductor layer becomes n-type. Thus, the concentration (concentration obtained by secondary ion mass spectrometry) of silicon or carbon in the semiconductor layer is set lower than or equal to $2\times10^{18}$ atoms/cm$^3$, preferably lower than or equal to $2\times10^{17}$ atoms/cm$^3$.

In addition, alkali metal and alkaline earth metal might generate carriers when bonded to an oxide semiconductor, in which case the off-state current of the transistor might be increased. Thus, the concentration (concentration obtained by secondary ion mass spectrometry) of alkali metal or alkaline earth metal in the semiconductor layer is set lower than or equal to $1\times10^{18}$ atoms/cm$^3$, preferably lower than or equal to $2\times10^{16}$ atoms/cm$^3$.

Furthermore, when nitrogen is contained in the oxide semiconductor forming the semiconductor layer, electrons serving as carriers are generated and the carrier concentration is increased, whereby the semiconductor layer easily becomes n-type. As a result, a transistor using an oxide semiconductor that contains nitrogen is likely to have normally-on characteristics. Therefore, the concentration (concentration obtained by secondary ion mass spectrometry) of nitrogen in the semiconductor layer is preferably set lower than or equal to $5\times10^{18}$ atoms/cm$^3$.

When hydrogen is contained in the oxide semiconductor included in the semiconductor layer, hydrogen and oxygen which is bonded to a metal atom combine to form water, and thus sometimes an oxygen vacancy is formed in the oxide semiconductor. When the channel formation region in the oxide semiconductor includes oxygen vacancies, the transistor sometimes has normally-on characteristics. In some cases, a defect in which hydrogen has entered an oxygen vacancy functions as a donor and generates an electron serving as a carrier. In other cases, part of hydrogen are combined to oxygen which is bonded to a metal atom and electrons serving as carriers are generated. Thus, a transistor using an oxide semiconductor that contains a large amount of hydrogen is likely to have normally-on characteristics.

A defect in which hydrogen has entered an oxygen vacancy can function as a donor of the oxide semiconductor. However, it is difficult to evaluate the defect quantitatively. Thus, the oxide semiconductor is sometimes evaluated by not its donor concentration but its carrier concentration. Therefore, in this specification and the like, the carrier concentration on the assumption that the state where an electric field is not applied is sometimes used as the parameter of the oxide semiconductor, instead of the donor concentration. That is, "carrier concentration" described in this specification and the like can be replaced with "donor concentration" in some cases.

Therefore, hydrogen in the oxide semiconductor is preferably reduced as much as possible. Specifically, the hydrogen concentration in the oxide semiconductor that is obtained by secondary ion mass spectrometry (SIMS) is set lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When an oxide semiconductor with a sufficiently low concentration of impurities such as hydrogen is used for a channel formation region of a transistor, the transistor can have stable electrical characteristics.

The semiconductor layer may have a non-single-crystal structure, for example. The non-single-crystal structure includes, for example, a CAAC-OS (C-Axis Aligned Crystalline Oxide Semiconductor) including a c-axis aligned crystal, a polycrystalline structure, a microcrystalline structure, or an amorphous structure. Among the non-single-crystal structures, the amorphous structure has the highest density of defect states, whereas the CAAC-OS has the lowest density of defect states.

An oxide semiconductor film having an amorphous structure has disordered atomic arrangement and no crystalline component, for example. In another example, an oxide film having an amorphous structure has a completely amorphous structure and no crystal part.

Note that the semiconductor layer may be a mixed film including two or more of a region having an amorphous structure, a region having a microcrystalline structure, a region having a polycrystalline structure, a CAAC-OS region, and a region having a single crystal structure. The mixed film has, for example, a single-layer structure or a stacked-layer structure including two or more of the above-described regions in some cases.

The composition of a CAC (Cloud-Aligned Composite)-OS, which is one embodiment of a non-single-crystal semiconductor layer, is described below.

The CAC-OS is, for example, a composition of a material in which elements that constitute an oxide semiconductor are unevenly distributed to have a size of greater than or equal to 0.5 nm and less than or equal to 10 nm, preferably greater than or equal to 1 nm and less than or equal to 2 nm, or a similar size. Note that in the following description, a state in which one or more metal elements are unevenly distributed and regions including the metal element(s) are mixed to have a size of greater than or equal to 0.5 nm and less than or equal to 10 nm, preferably greater than or equal to 1 nm and less than or equal to 2 nm, or a similar size in an oxide semiconductor is referred to as a mosaic pattern or a patch-like pattern.

Note that the oxide semiconductor preferably contains at least indium. In particular, indium and zinc are preferably contained. In addition to these, one or a plurality of kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, a CAC-OS in an In—Ga—Zn oxide (an In—Ga—Zn oxide in the CAC-OS may be particularly referred to as CAC-IGZO) has a composition in which materials are separated into indium oxide (hereinafter referred to as $InO_{X1}$ (X1 is a real number greater than 0)) or indium zinc oxide (hereinafter referred to as $In_{X2}Zn_{Y2}O_{Z2}$ (each of X2, Y2, and Z2 is a real number greater than 0)), and gallium oxide (hereinafter referred to as $GaO_{X3}$ (X3 is a real number greater than 0)), or gallium zinc oxide (hereinafter referred to as $Ga_{X4}Zn_{Y4}O_{Z4}$ (each of X4, Y4, and Z4 is a real number greater than 0)), and a mosaic pattern is formed, and mosaic-like $InO_{X1}$ or $In_{X2}Zn_{Y2}O_{Z2}$ is evenly distributed in the film (this composition is hereinafter also referred to as a cloud-like composition).

That is, the CAC-OS is a composite oxide semiconductor having a composition in which a region where $GaO_{X3}$ is a main component and a region where $In_{X2}Zn_{Y2}O_{Z2}$ or $InO_{X1}$ is a main component are mixed. Note that in this specification, for example, when the atomic ratio of In to an element M in a first region is larger than the atomic ratio of In to the element M in a second region, the first region is regarded as having a higher In concentration than the second region.

Note that IGZO is a common name and sometimes refers to one compound formed of In, Ga, Zn, and O. A typical example is a crystalline compound represented by $InGaO_3(ZnO)_{m1}$ (m1 is a positive integer greater than or equal to 1) or $In_{(1+x0)}Ga_{(1-x0)}O_3(ZnO)_{m0}$ ($-1 \le x0 \le 1$; m0 is a positive integer greater than or equal to 1).

The crystalline compound has a single crystal structure, a polycrystalline structure, or a CAAC structure. Note that the CAAC structure is a crystal structure in which a plurality of IGZO nanocrystals have c-axis alignment and are connected in an a-b plane without alignment.

Meanwhile, the CAC-OS relates to the material composition of an oxide semiconductor. In the material composition of a CAC-OS containing In, Ga, Zn, and O, some regions that contain Ga as a main component and are observed as nanoparticles and some regions that contain In as a main component and are observed as nanoparticles are each randomly dispersed in a mosaic pattern. Thus, the crystal structure is a secondary element for the CAC-OS.

Note that the CAC-OS is regarded as not including a stacked-layer structure of two or more kinds of films with different compositions. For example, a two-layer structure of a film containing In as a main component and a film containing Ga as a main component is not included.

Note that a clear boundary between the region where $GaO_{X3}$ is a main component and the region where $In_{X2}Zn_{Y2}O_{Z2}$ or $InO_{X1}$ is a main component cannot be observed in some cases.

Note that in the case where one kind or a plurality of kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, or the like are contained instead of gallium, the CAC-OS refers to a composition in which some regions that contain the metal element(s) as a main component and are observed as nanoparticles and some regions that contain In as a main component and are observed as nanoparticles are each randomly dispersed in a mosaic pattern.

The CAC-OS can be formed by a sputtering method under a condition where intentional heating is not performed on a substrate, for example. In the case of forming the CAC-OS by a sputtering method, one or more selected from an inert gas (typically, argon), an oxygen gas, and a nitrogen gas may be used as a deposition gas. Furthermore, the ratio of the flow rate of an oxygen gas to the total flow rate of the deposition gas at the time of deposition is preferably as low as possible, and for example, the ratio of the flow rate of the oxygen gas is preferably higher than or equal to 0% and lower than 30%, further preferably higher than or equal to 0% and lower than or equal to 10%.

The CAC-OS is characterized in that no clear peak is observed in measurement using 0120 scan by an Out-of-plane method, which is one of the X-ray diffraction (XRD) measurement methods. That is, it is found from X-ray diffraction measurement that no alignment in an a-b plane direction and a c-axis direction is observed in a measured region.

In an electron diffraction pattern of the CAC-OS which is obtained by irradiation with an electron beam with a probe diameter of 1 nm (also referred to as a nanometer-sized electron beam), a ring-like region with high luminance and a plurality of bright spots in the ring-like region are observed. It is therefore found from the electron diffraction pattern that the crystal structure of the CAC-OS includes an nc (nano-crystal) structure with no alignment in a plan-view direction and a cross-sectional direction.

Moreover, for example, it can be confirmed by EDX mapping obtained using energy dispersive X-ray spectroscopy (EDX) that the CAC-OS in the In—Ga—Zn oxide has a composition in which regions where $GaO_{X3}$ is a main component and regions where $In_{X2}Zn_{Y2}O_{Z2}$ or $InO_{X1}$ is a main component are unevenly distributed and mixed.

The CAC-OS has a composition different from that of an IGZO compound in which metal elements are evenly distributed, and has characteristics different from those of the IGZO compound. That is, the CAC-OS has a composition in which regions where $GaO_{X3}$ or the like is a main component and regions where $In_{X2}Zn_{Y2}O_{Z2}$ or $InO_{X1}$ is a main component are phase-separated from each other, and the regions including the respective elements as the main components form a mosaic pattern.

Here, a region where $In_{X2}Zn_{Y2}O_{Z2}$ or $InO_{X1}$ is a main component is a region whose conductivity is higher than that of a region where $GaO_{X3}$ or the like is a main component. In other words, when carriers flow through regions where $In_{X2}Zn_{Y2}O_{Z2}$ or $InO_{X1}$ is a main component, the conductivity of an oxide semiconductor is exhibited. Accordingly, when the regions where $In_{X2}Zn_{Y2}O_{Z2}$ or $InO_{X1}$ is a main component are distributed like a cloud in an oxide semiconductor, high field-effect mobility (μ) can be achieved.

In contrast, a region where $GaO_{X3}$ or the like is a main component is a region whose insulating property is higher than that of a region where $In_{X2}Zn_{Y2}O_{Z2}$ or $InO_{X1}$ is a main component. In other words, when regions where $GaO_{X3}$ or the like is a main component are distributed in an oxide semiconductor, leakage current can be suppressed and favorable switching operation can be achieved.

Accordingly, when the CAC-OS is used for a semiconductor device, the insulating property derived from $GaO_{X3}$ or the like and the conductivity derived from $In_{X2}Zn_{Y2}O_{Z2}$ or $InO_{X1}$ complement each other, whereby high on-state current ($I_{on}$) and high field-effect mobility (μ) can be achieved.

A semiconductor device using the CAC-OS has high reliability. Thus, the CAC-OS is suitable for a constituent material of a variety of semiconductor devices.

Amorphous silicon, microcrystalline silicon, polycrystalline silicon, single crystal silicon, or the like can be used for the channel formation region of the Si transistor. Note that polycrystalline silicon is preferably used in the case where a transistor is provided over an insulating surface of a glass substrate or the like.

High-quality polycrystalline silicon can be obtained easily by using a laser crystallization step or the like. The high-quality polycrystalline silicon can also be obtained by a solid-phase growth method in which a metal catalyst such as nickel or palladium is added to amorphous silicon and then heated. Crystallinity may be further increased by laser irradiation on the polycrystalline silicon formed by the solid-phase growth method using a metal catalyst. Note that the metal catalyst remains in the polycrystalline silicon and worsens electrical characteristics of the transistor; therefore, it is preferable to provide a region to which phosphorus, a noble gas, or the like is added other than the channel formation region, in which case the region captures the metal catalyst.

Note that structures by which the effect of one embodiment of the present invention is obtained are not limited to those described above: Si transistors may be used as all the transistors included in the pixel. One or more of the transistors included in the pixel may be p-channel transistors.

Figure 2A:
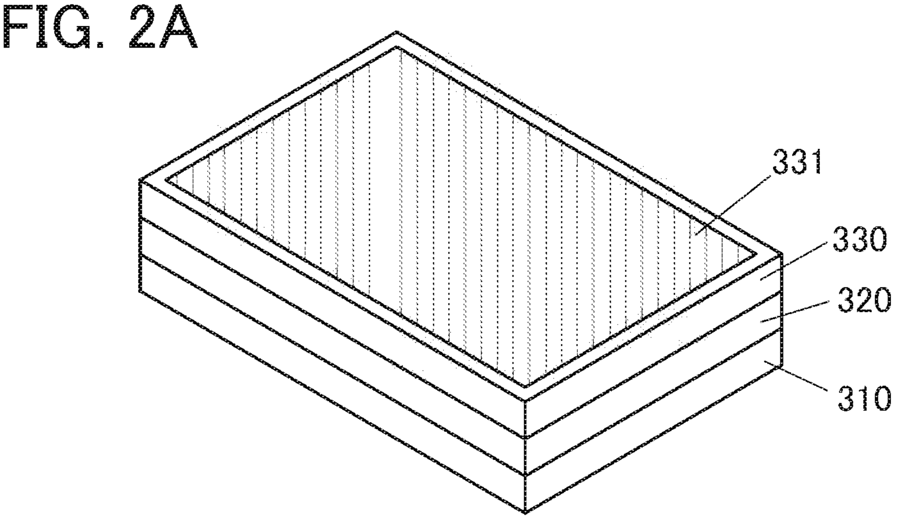
FIG. 2A and FIG. 2B are diagrams each illustrating a display devices.
Figure 2B:
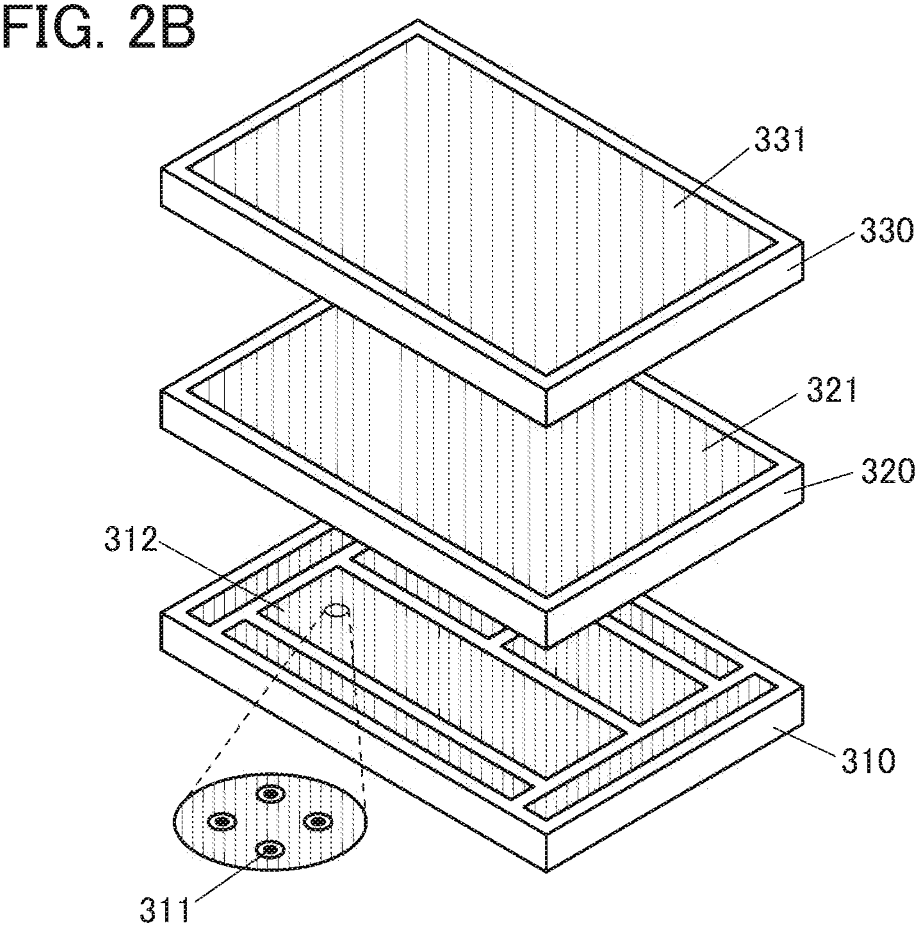

FIG. 2A is a diagram illustrating an example of a display device having a stacked-layer structure, and FIG. 2B is a developed view and an enlarged view of a part of the display device. In the display device having a stacked-layer structure, a layer 310 including a silicon substrate or the like, a layer 320 including a wiring or the like, and a layer 330 including a light-emitting device may be stacked in this order. In the stacked-layer structure, circuits can be formed so as to overlap with each other and thus the display device can have a narrow bezel.

The layer 310 can include a Si transistor 311 and a functional circuit 312 which are components of a pixel circuit. Note that the Si transistor 311 can be positioned in a region that does not interfere with the functional circuit 312. The layer 320 can include an OS transistor 321 which is a component of the pixel circuit. The layer 330 can include an LED array 331.

The LED array 331 has a structure in which LEDs are arranged in a matrix. As the LED, for example, a micro LED whose diameter or length of one side is less than or equal to 50 μm or a mini LED whose diameter or length of one side is greater than 50 μm and less than or equal to 200 μm can be used.

As the functional circuit 312, any one or more of a source driver, a gate driver, a memory circuit, an arithmetic circuit, and a power supply circuit can be provided, for example. Part or the whole of the gate driver and the memory circuit can also be formed using an OS transistor. Details of the stacked-layer structure will be described in Embodiment 2.

<Operation Method of Structure Example 1>

Figure 3:
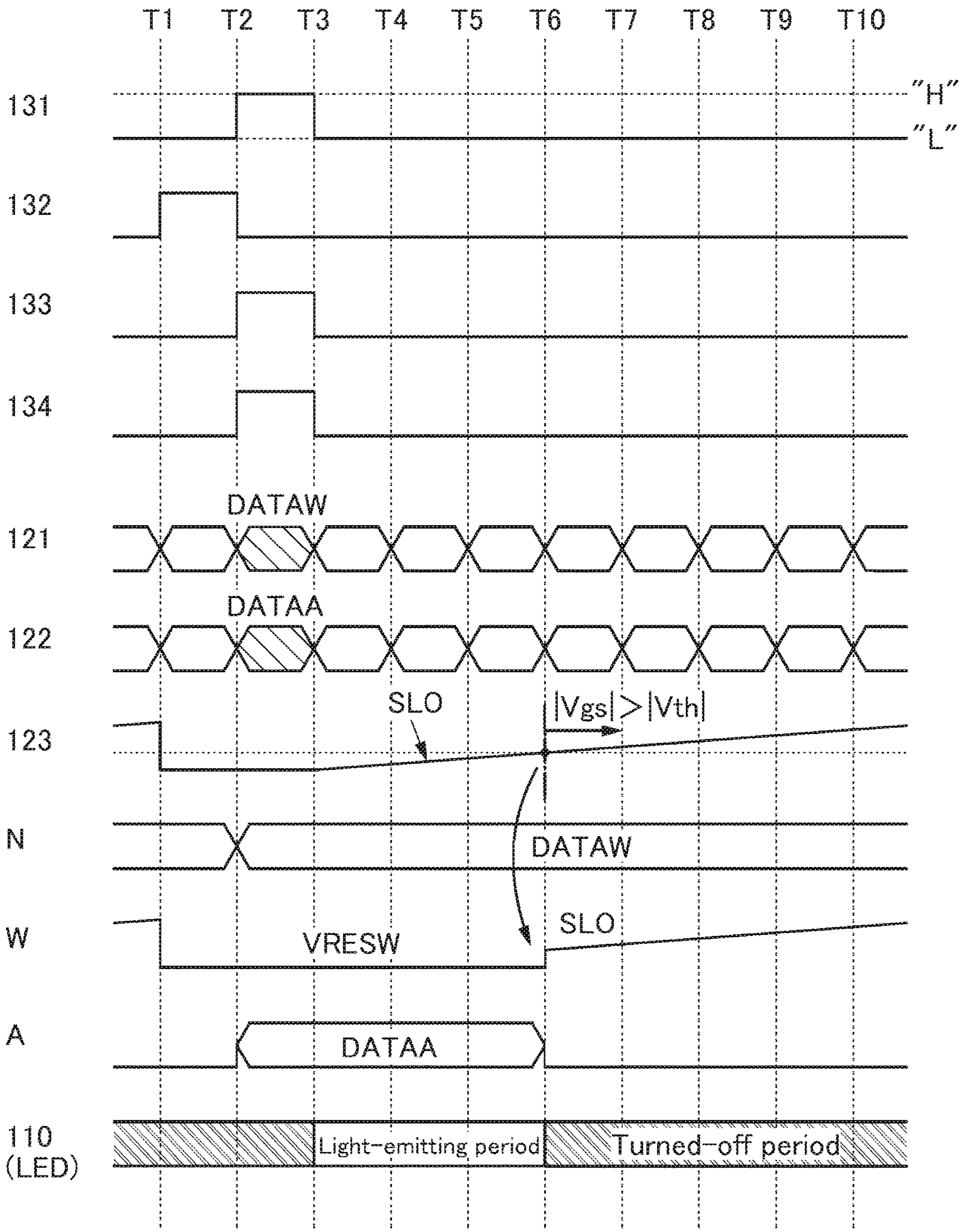
FIG. 3 is a timing chart showing an operation of a pixel.

Next, the operation of the pixel 10*a* is described with reference to a timing chart shown in FIG. 3 and diagrams illustrating circuit operations in FIG. 4A to FIG. 5B. In FIG. 4A to FIG. 5B, the dashed arrows denote the potential supplied to the circuit and the dotted arrows denote the current flowing through the light-emitting device 110 (ILED). In the timing chart, switching of a supplied signal and switching of a signal for controlling conduction and non-conduction of a switch (a transistor) are sometimes illustrated to be performed at the same time. Actually, the timings of the switching are different, and changes in the potential of the nodes are as described below.

Figure 4A:
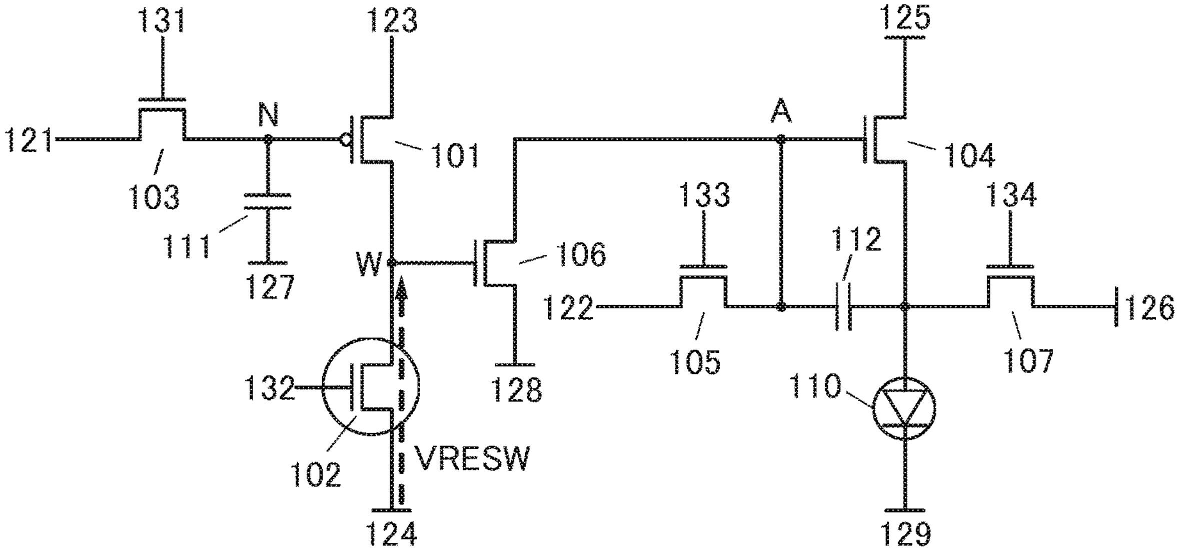
FIG. 4A and FIG. 4B are diagrams each illustrating an operation of a pixel circuit.
Figure 4B:
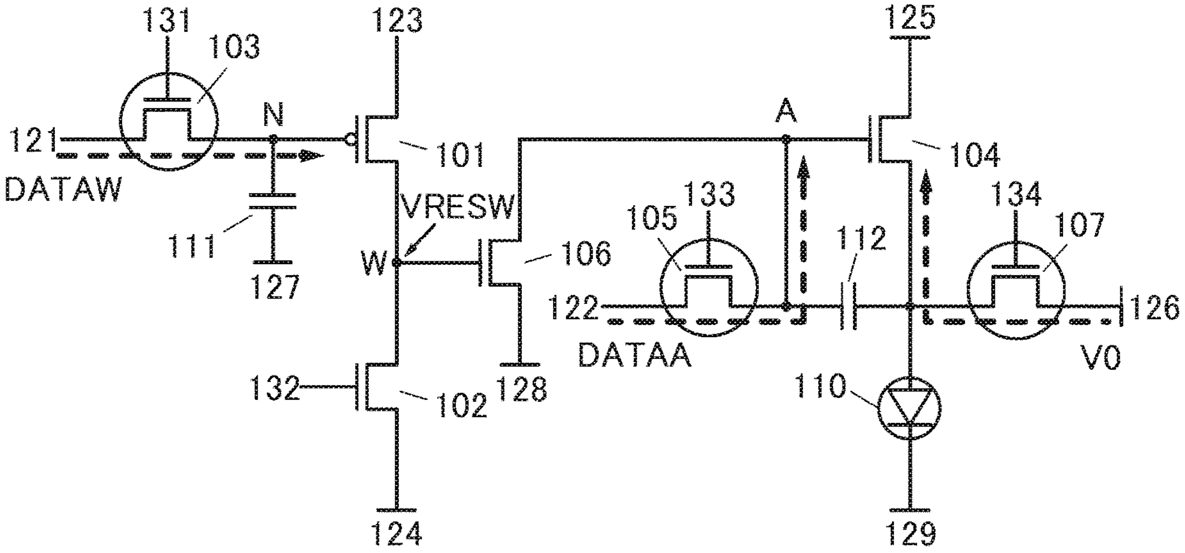

First, at time T1, when a low potential ("L") is supplied to the wirings 131, 133, and 134 and a high potential ("H") is supplied to the wiring 132, the transistor 102 is turned on and the potential VRESW (a reset potential with a low potential) of the wiring 124 is supplied to the node W (see FIG. 4A). The operation is a reset operation of the node W, and the transistor 106 is turned off at this time.

At time T2, when the high potential ("H") is supplied to the wirings 131, 133, and 134 and the low potential ("L") is supplied to the wiring 132, the transistor 103 is turned on and a potential DATAW (a data potential for determining a width of a pulse-signal to be generated) of the wiring 121 is supplied to the node N. In addition, the transistor 105 is turned on and a potential DATAA (a data potential for determining an amplitude) is supplied to the node A (the gate of the transistor 104). At this time, the transistor 107 is also on and thus the source potential of the transistor 104 becomes a reset potential supplied from the wiring 126, whereby an appropriate gate-source voltage (Vgs) can be written (see FIG. 4B). At this time, although the transistor 104 is turned on, the current flows to the wiring 126 and thus the light-emitting device 110 does not emit light.

At time T3, when the low potential ("L") is supplied to the wirings 131, 132, 133, and 134, the transistor 103 is turned off and the potential DATAW is held in the node N. In addition, the transistor 105 is turned off and the potential DATAA is held in the node A. Then the transistor 107 is turned off, current corresponding to the potential DATAA flows from the transistor 104 to the light-emitting device 110, whereby the light-emitting device 110 emits light.

Figure 5A:
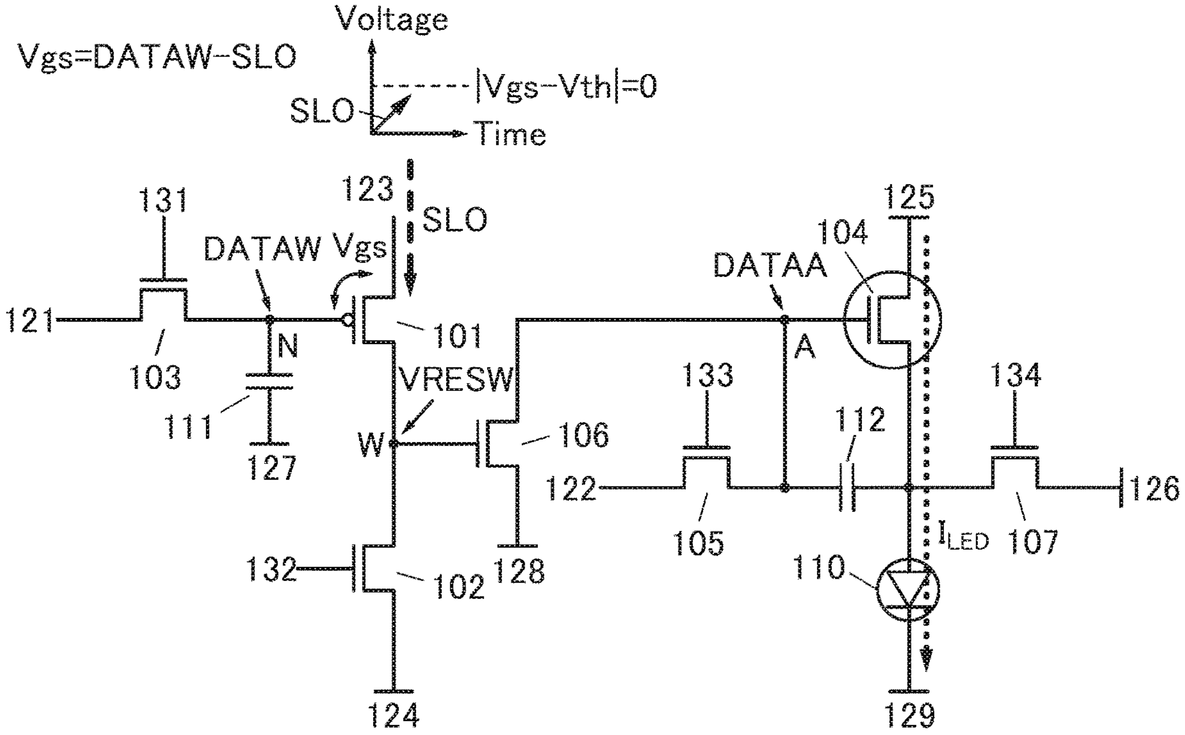
FIG. 5A and FIG. 5B are diagrams each illustrating an operation of a pixel circuit.

In addition, the slope potential SLO that increases over time starts to be supplied to the wiring 123 from time T3. FIG. 5A illustrates a state where Vgs=the potential DATAW−the slope potential SLO and |Vgs|<|Vth| (Vth is a threshold voltage) in the transistor 101, that is, a state where the transistor 101 is turned off. At this time, the light-emitting device 110 continues to emit light because the potential of the node A does not change.

Figure 5B:
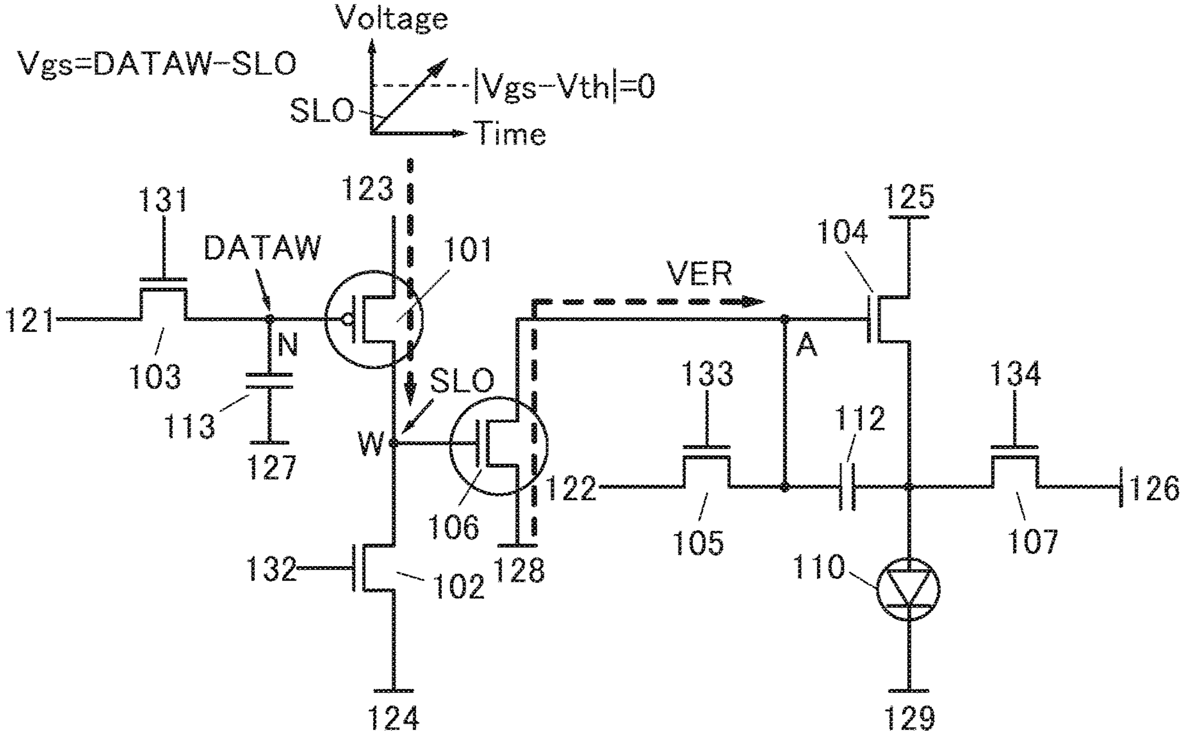

Then, when the slope potential SLO further increases, for example, after time T6, |Vgs|>|Vth| as illustrated in FIG. 5B. At this time, since the transistor 101 is turned on, the potential of the node W immediately increases to the slope potential SLO of the time, whereby the transistor 106 is also turned on. Then, the potential of the node A is immediately discharged from the potential DATAA to a potential VER of the wiring 128 (the potential VER<the potential DATAA). At this time, the transistor 104 is turned off, whereby the light-emitting device 110 is turned off.

As described above, the pixel 10*a* first emits light in accordance with the potential DATAA written to the node A. Then, the potential of the node A is discharged in accordance with the width of the pulse-signal generated by the potential DATAW and the slope potential SLO, whereby light emission is terminated.

In other words, PAM control in which the light-emitting time is kept constant and the emission intensity is changed or PWM control in which the emission intensity is kept constant and the light-emitting time is changed can be performed. In addition, since the light-emitting time and the emission intensity can be set arbitrarily, it can also be said that PAM+PWM control (the pulse width control involving changes in amplitude) can be performed.

<Modification Examples of Structure Example 1>

Figure 6A:
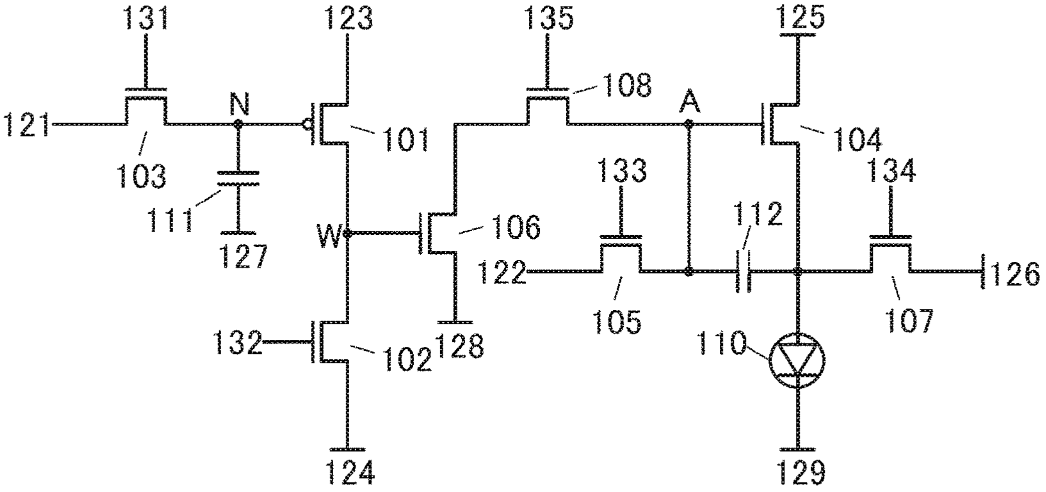
FIG. 6A to FIG. 6C are diagrams each illustrating a modified example of a pixel circuit.
Figure 6B:
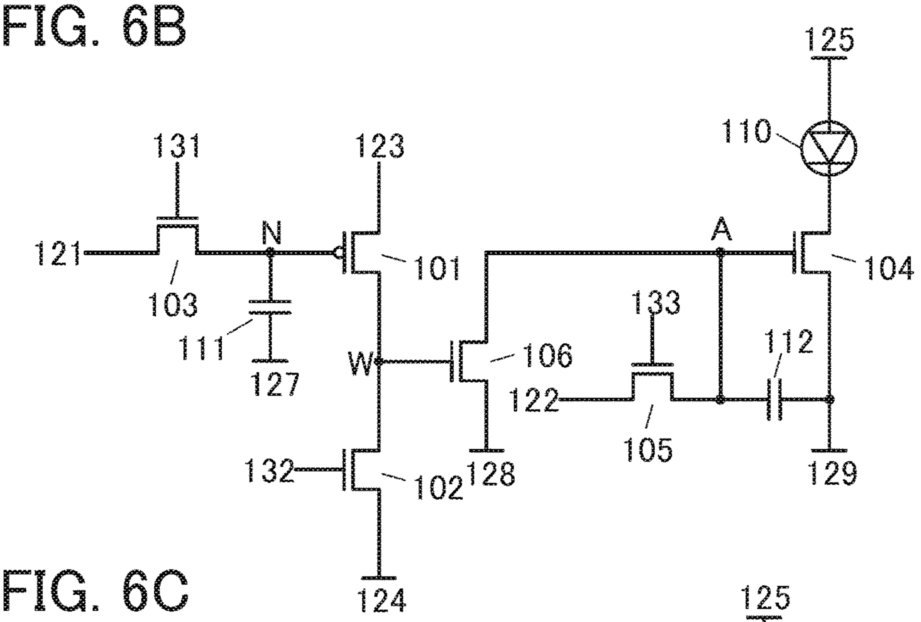
Figure 6C:
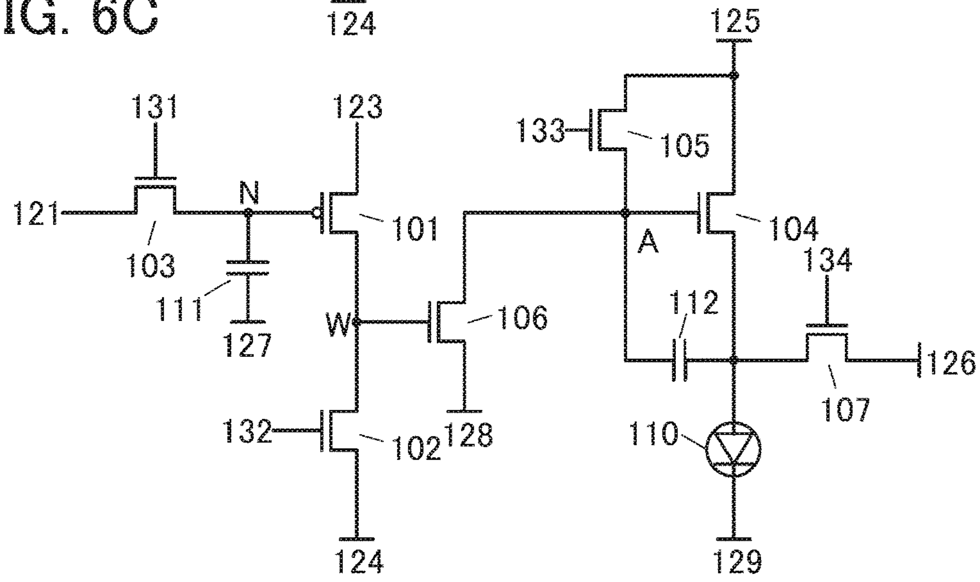

FIG. 6A to FIG. 6C are modification examples of a circuit of the pixel 10*a* illustrated in FIG. 1.

FIG. 6A shows an example in which a transistor 108 is added to the pixel 10*a* illustrated in FIG. 1. One of a source and a drain of the transistor 108 is electrically connected to the one of the source and the drain of the transistor 106, and the other of the source and the drain of the transistor 108 is electrically connected to the gate of the transistor 104. A gate of the transistor 108 is electrically connected to a wiring 135. The wiring 135 is a gate line that controls conduction and non-conduction of the transistor 108.

As described above, for rapid discharge, a Si transistor with high gm is suitably used as the transistor 106. On the other hand, in terms of holding the potential of the node A, the transistor 106 is preferably a transistor with a low off-state current. Since a Si transistor has relatively high off-state current, the potential of the node A cannot be sufficiently held in some cases depending on the operation method in the structure of FIG. 1.

In such a case, the transistor 108 formed of an OS transistor is preferably provided. Since an OS transistor has an extremely low off-state current, the potential of the node A can be held even when the off-state current (leakage current) of the transistor 106 is high. In particular, it is effective for a display device operated at a frame frequency of less than or equal to 10 Hz.

FIG. 6B illustrates an example in which the connection of the light-emitting device 110 is different from the pixel 10*a* illustrated in FIG. 1. A variety of forms of LED are used as the light-emitting device 110. In the case where the cathode of the LED has a form that is easily connected to the pixel electrode, it is preferable that the cathode of the light-emitting device 110 be electrically connected to the other of the source and the drain of the transistor 104 and the anode of the light-emitting device 110 be electrically connected to the wiring 125. With this structure, the source of the transistor 104 can be connected to the wiring 129 that is a low potential power supply line; thus, the transistor 107 may be omitted.

In the example of FIG. 6C, the connection of the transistor 105 is changed and a circuit dedicated to PWM control is obtained. In the structure illustrated in FIG. 1, given signal potential can be input to the node A through the transistor 105. On the other hand in the structure illustrated in FIG. 6C, a constant high potential is input to the node A because the other of the source and the drain of the transistor 105 is electrically connected to the wiring 125. Therefore, charging at a constant potential and discharging corresponding to the pulse-signal are constantly performed in the node A, whereby a dedicated circuit for PWM control can be obtained.

<Structure Example 2>

Figure 7:
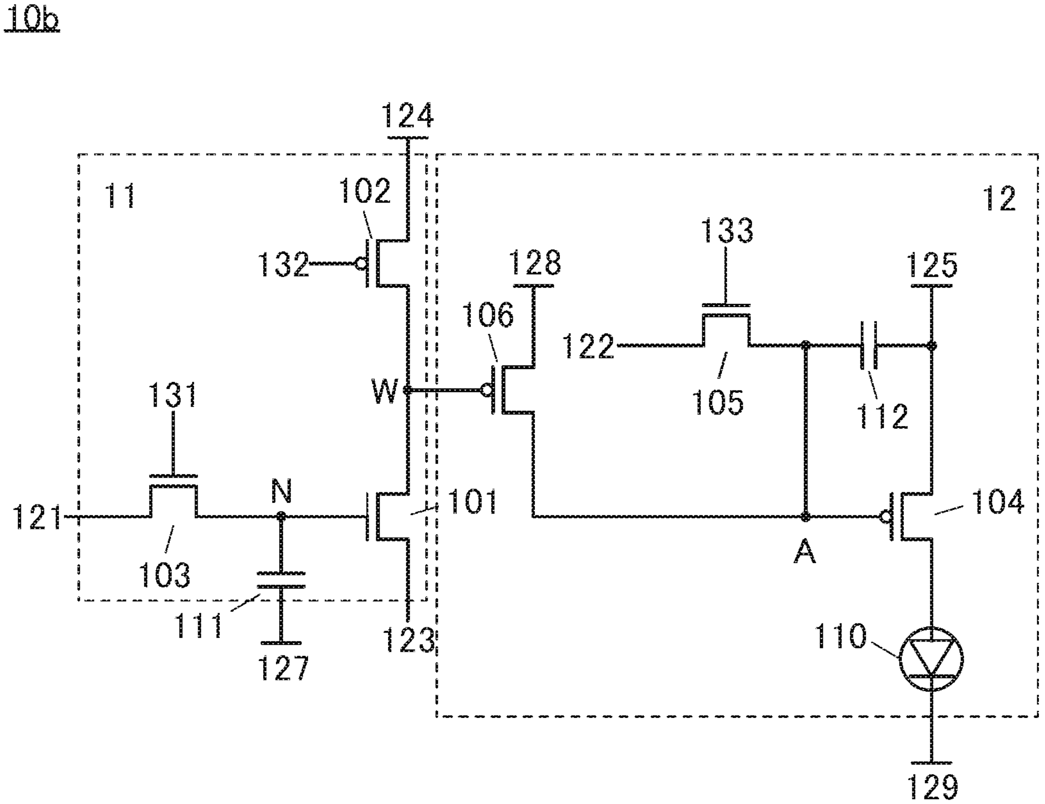
FIG. 7 is a diagram illustrating a pixel circuit.

FIG. 7 is a circuit diagram illustrating a pixel 10*b* that is different from Structure Example 1. The pixel 10*b* is different from the pixel 10*a* described in Structure Example 1 in the conductivity type of each of the transistors 101 and 102 of the pulse-signal-generation portion 11 and the transistors 104 and 106 of the light-emitting control portion 12. The pixel 10*b* is also different from the pixel 10*a* in that the transistor 107 is not provided. In addition, the description that is in common with Structure Example 1 is omitted.

The pulse-signal-generation portion 11 can include the transistor 101, the transistor 102, the transistor 103, and the capacitor 111. Here, the transistor 102 can be a p-channel transistor. Although an example in which n-channel transistors are used as the other transistors is illustrated in FIG. 7, transistors functioning as switches may be p-channel transistors.

The light-emitting control portion 12 includes the transistor 104, the transistor 105, the transistor 106, the capacitor 112, and the light-emitting device 110. Here, the transistors 104 and 106 can be p-channel transistors. Although an example in which n-channel transistor is used as the transistor 105 is illustrated in FIG. 7, the transistor 105 may be a p-channel transistor.

The connection structure of the transistors 101, 102, and 103 and the capacitor 111 in the pulse-signal-generation portion 11 is similar to that of the pixel 10*a*.

In the light-emitting control portion 12, the gate of the transistor 104 is electrically connected to one of the source and the drain of the transistor 105, the one electrode of the capacitor 112, and one of the source and the drain of the transistor 106. The one of the source and the drain of the transistor 104 is electrically connected to one electrode (an anode) of the light-emitting device 110. The other of the source and the drain of the transistor 104 is electrically connected to the other electrode of the capacitor 112.

The connection relation between the transistors and the like and the wirings and the function of the transistors and the like are similar to those in the pixel 10*a*. The wiring 128 is a fixed electric potential line and can be a wiring for supplying a potential higher than the highest signal potential supplied from the wiring 122. Any one of the wirings 124, 125, and 128 and the other one or more of the wirings 124, 125, and 128 may be a common wiring. The wiring 127 and the wiring 129 may be a common wiring.

Since the transistor 104 is a p-channel transistor, the source thereof is connected to the wiring 125, which is a high potential power supply line. Therefore, the transistor 107 may be omitted.

As the transistors 101 to 106, Si transistors, OS transistors, or the like can be used. In particular, Si transistors and OS transistors are preferably used in combination.

For example, in the circuit structure illustrated in FIG. 7, Si transistors are preferably used as the transistors 102, 104, and 106, and OS transistors are preferably used as the other transistors. The OS transistor can be provided in a step for providing a wiring layer over the Si transistor.

<Operation Method of Structure Example 2>

Figure 8:
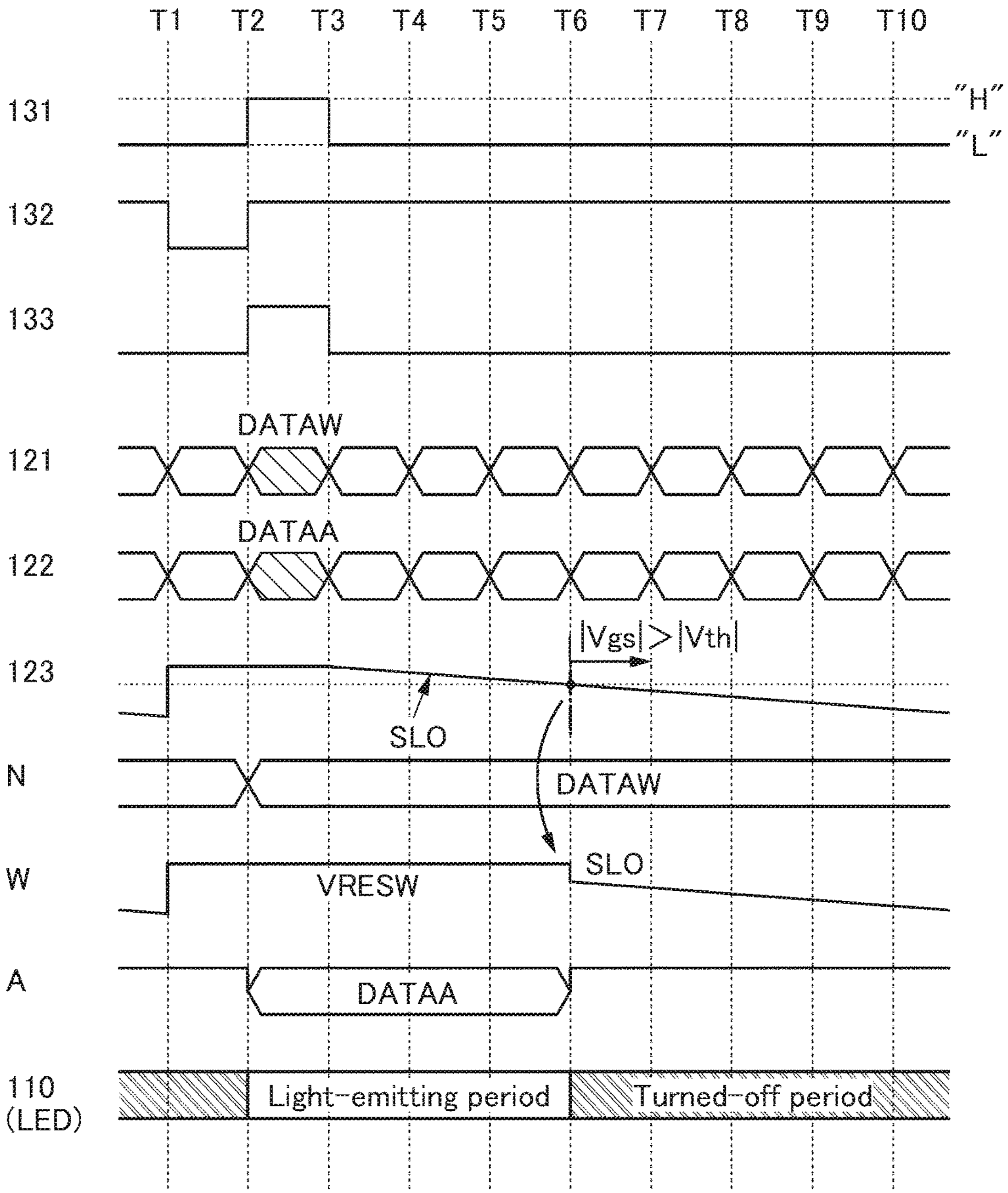
FIG. 8 is a timing chart showing an operation of a pixel circuit.

Next, the operation of the pixel 10*b* is described with reference to a timing chart shown in FIG. 8 and diagrams illustrating circuit operations in FIG. 9A to FIG. 10B.

Figure 9A:
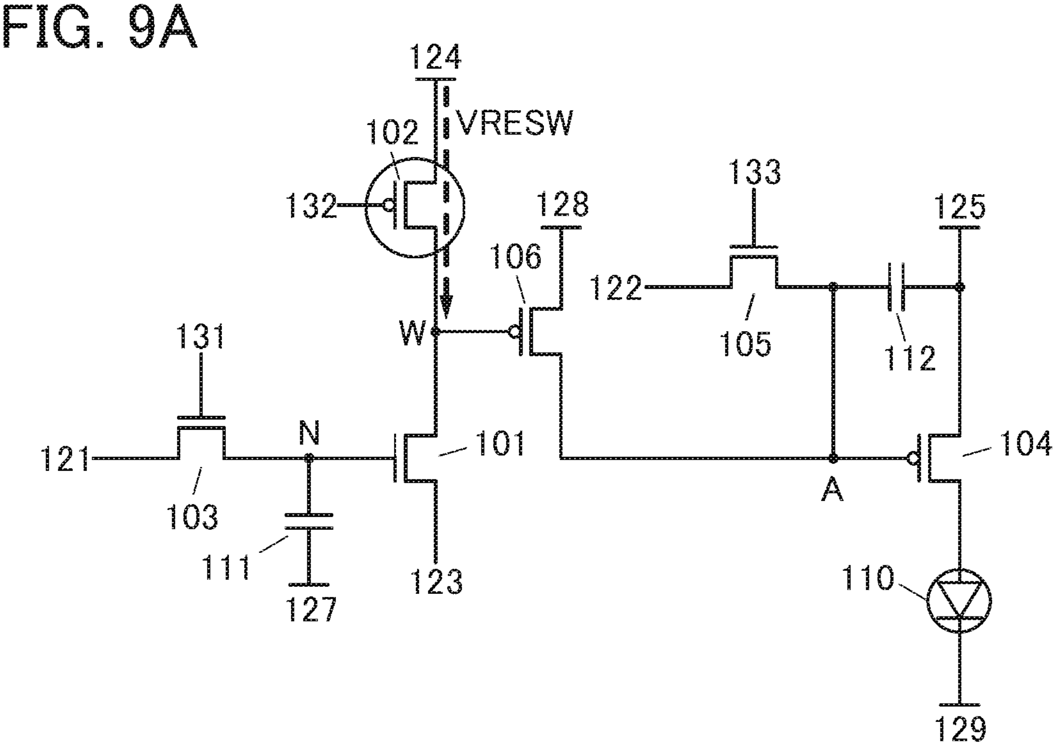
FIG. 9A and FIG. 9B are diagrams each illustrating an operation of a pixel circuit.
Figure 9B:
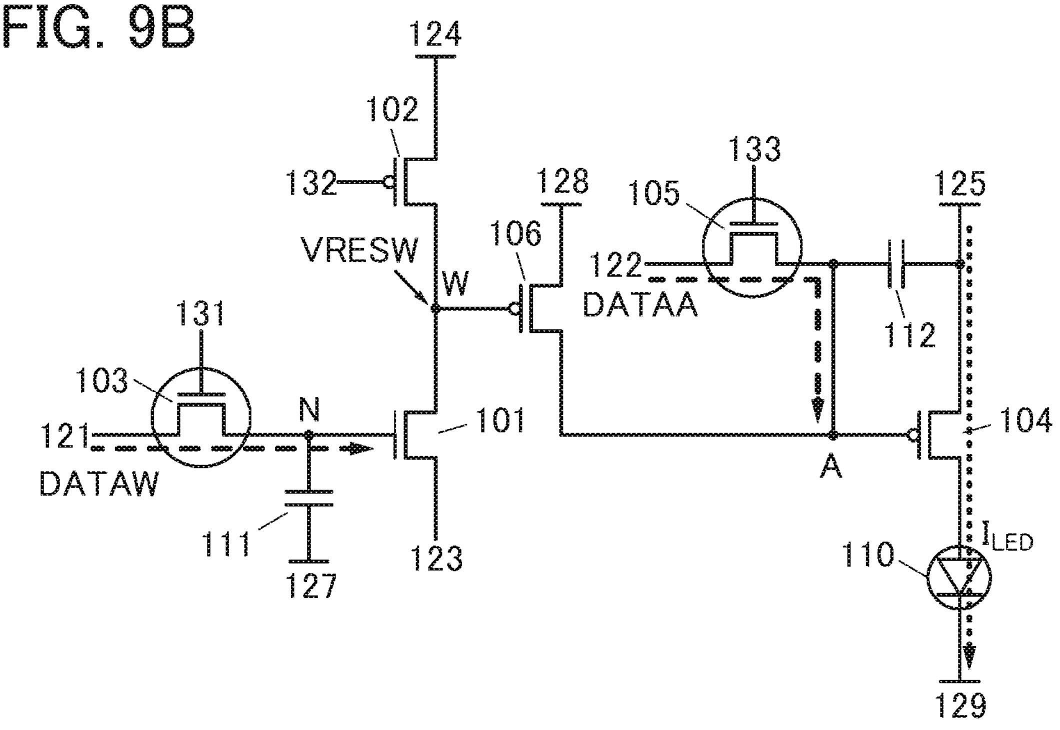

First, at time T1, when a low potential ("L") is supplied to the wirings 131, 132, and 133, the transistor 102 is turned on and the potential VRESW (a reset potential of a high potential) of the wiring 124 is supplied to the node W (see FIG. 9A). The operation is a reset operation of the node W, and the transistor 106 is turned off at this time.

At time T2, when a high potential ("H") is supplied to the wirings 131, 132, and 133, the transistor 103 is turned on and the potential DATAW (a data potential for determining a width of a pulse-signal to be generated) of the wiring 121 is supplied to the node N. In addition, the transistor 105 is turned on and the potential DATAA (a data potential for determining an amplitude) is supplied to the node A (the gate of the transistor 104). Then, current corresponding to the potential DATAA flows from the transistor 104 to the light-emitting device 110, whereby the light-emitting device 110 emits light (see FIG. 9B).

Next, at time T3, when the low potential ("L") is supplied to the wirings 131 and 133 and the high potential ("H") is supplied to the wiring 132, the transistor 103 is turned off and the potential DATAW is held in the node N. In addition, the transistor 105 is turned off and the potential DATAA is held in the node A.

Figure 10A:
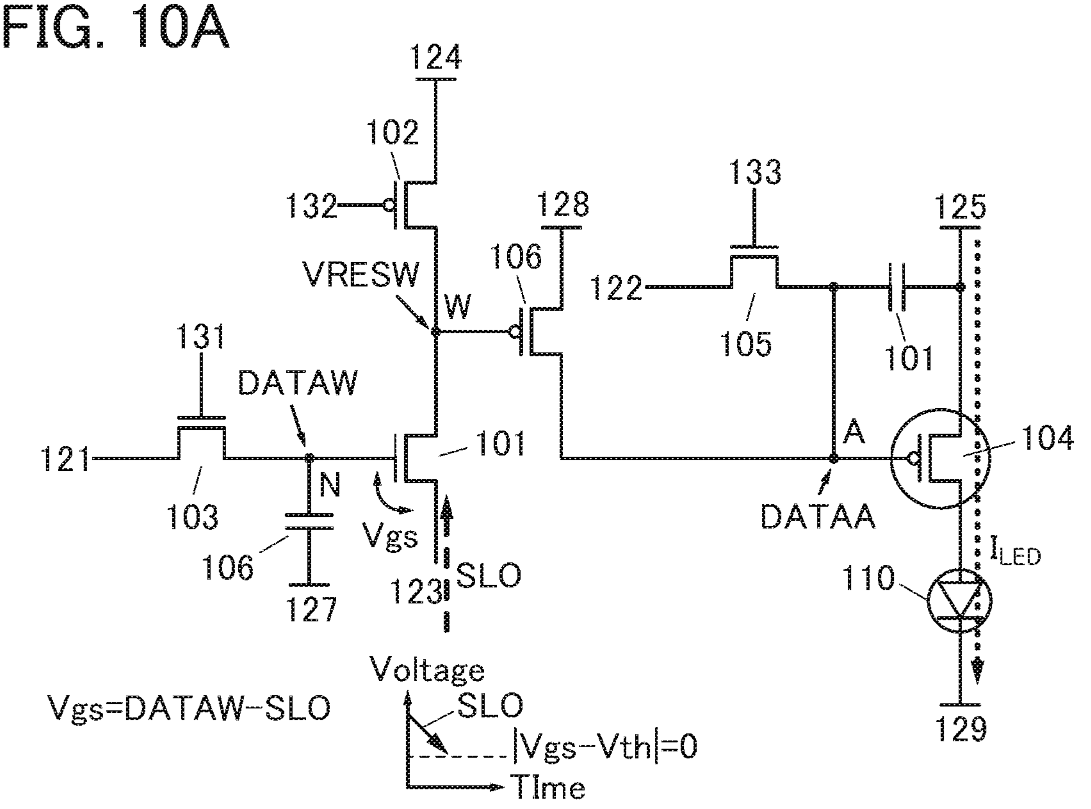
FIG. 10A and FIG. 10B are diagrams each illustrating an operation of a pixel circuit.

In addition, the slope potential SLO that decreases over time starts to be supplied to the wiring 123 from time T3. FIG. 10A illustrates a state where "Vgs=the potential DATAW−the slope potential SLO" and "|Vgs|<|Vth| (Vth is a threshold voltage)" are satisfied in the transistor 101, that is, a state where the transistor 101 is off. At this time, the light-emitting device 110 continues to emit light because the potential of the node A does not change.

Figure 10B:
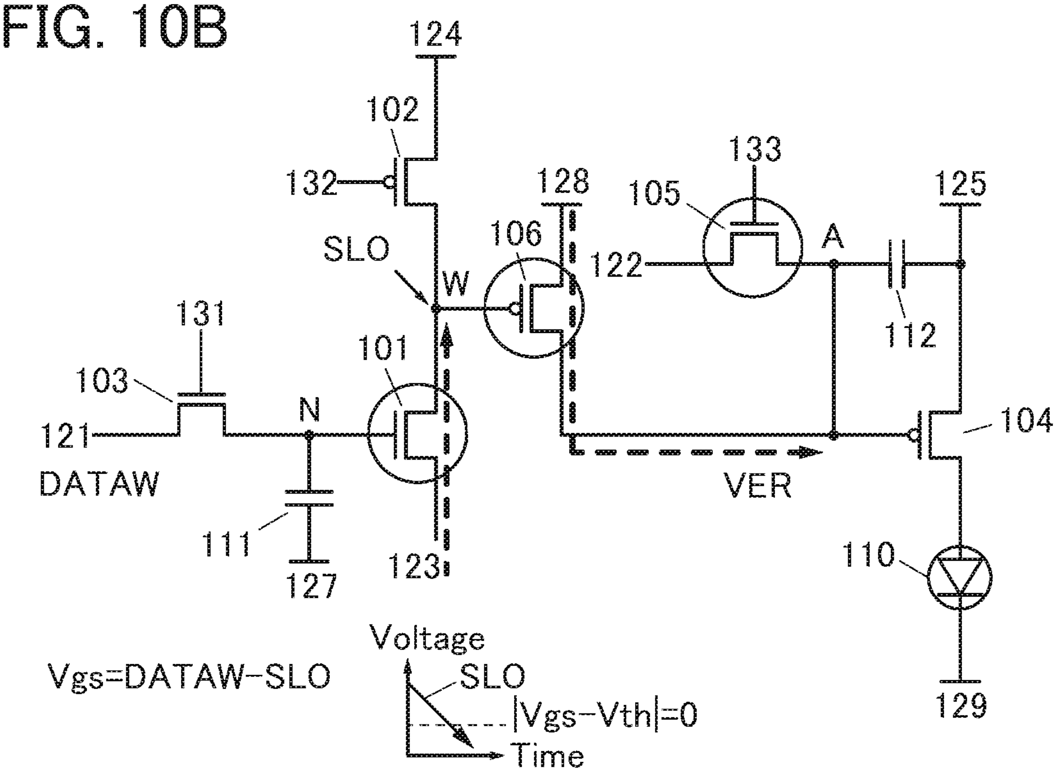

Then, when the slope potential SLO further decreases, for example, after time T6, |Vgs| becomes larger than |Vth| as illustrated in FIG. 10B. At this time, since the transistor 101 is turned on, the potential of the node W immediately decreases to the slope potential SLO of the time, whereby the transistor 106 is also turned on. Then, the potential of the node A is immediately charged from the potential DATAA to the potential VER of the wiring 128 (the potential VER>the potential DATAA). At this time, the transistor 104 is turned off, whereby the light-emitting device 110 is turned off.

As described above, the pixel 10*b* first emits light in accordance with the potential DATAA written to the node A. Then, the potential of the node A is charged in accordance with the width of the pulse-signal generated by the potential DATAW and the slope potential SLO, whereby light emission is terminated.

<Modification Examples of Structure Example 2>

Figure 11A:
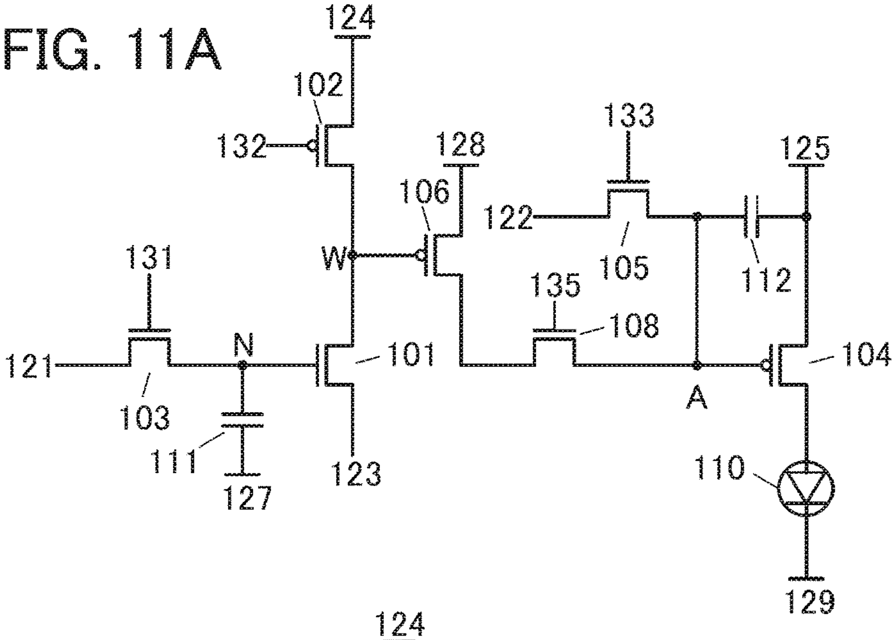
FIG. 11A to FIG. 11C are diagrams each illustrating a modified example of a pixel circuit.
Figure 11B:
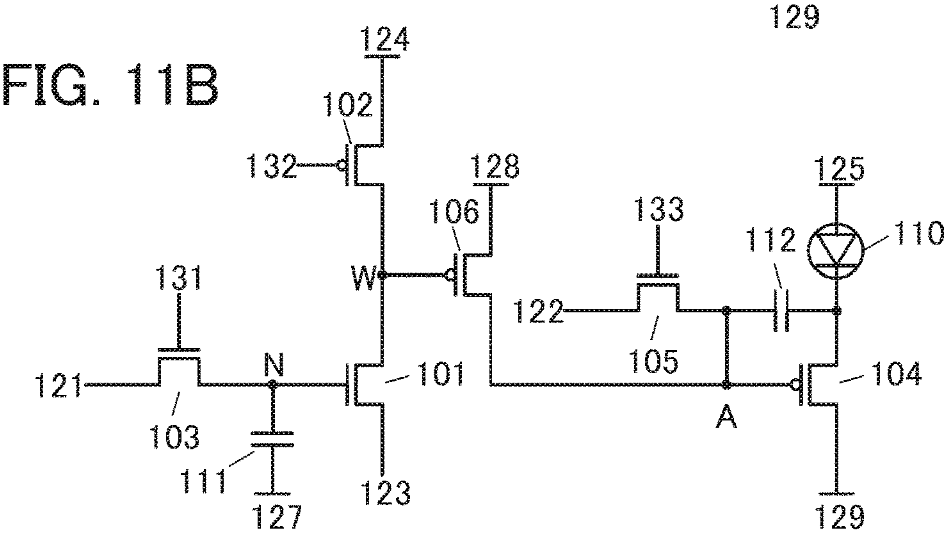
Figure 11C:
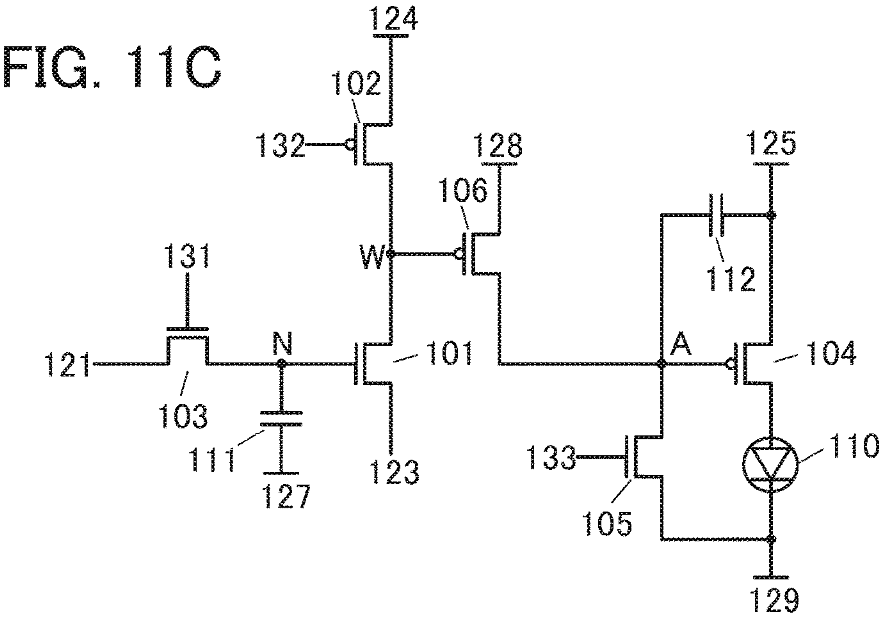

FIG. 11A to FIG. 11C are modification examples of a circuit of the pixel 10*b* illustrated in FIG. 7.

FIG. 11A shows an example in which a transistor 108 is added to the pixel 10*b* illustrated in FIG. 7. One of a source and a drain of the transistor 108 is electrically connected to the one of the source and the drain of the transistor 106, and the other of the source and the drain of the transistor 108 is electrically connected to the gate of the transistor 104. The gate of the transistor 108 is electrically connected to the wiring 135. The wiring 135 is a gate line that controls conduction and non-conduction of the transistor 108.

As described above, for rapid charge, a Si transistor with high gm is suitably used as the transistor 106. On the other hand, in terms of holding the potential of the node A, the transistor 106 is preferably a transistor with a low off-state current. Since a Si transistor has relatively high off-state current, the potential of the node A cannot be sufficiently held in some cases depending on the operation method in the structure of FIG. 7.

In such a case, the transistor 108 formed of an OS transistor is preferably provided. Since an OS transistor has an extremely low off-state current, the potential of the node A can be held even when the off-state current (leakage current) of the transistor 106 is high. In particular, it is effective for a display device operated at a frame frequency of less than or equal to 10 Hz.

FIG. 11B illustrates an example in which the connection of the light-emitting device 110 is different from the pixel 10*b* illustrated in FIG. 7. A variety of forms of LED are used as the light-emitting device 110. In the case where the cathode of the LED has a form that is easily connected to the pixel electrode, it is preferable that the cathode of the light-emitting device 110 be electrically connected to the other of the source and the drain of the transistor 104 and the anode of the light-emitting device 110 be electrically connected to the wiring 125.

In the example of FIG. 11C, the connection of the transistor 105 is changed and a circuit dedicated to PWM control is obtained. In the structure illustrated in FIG. 7, given signal potential can be input to the node A through the transistor 105. On the other hand in the structure illustrated in FIG. 11C, a constant low potential is input to the node A because the other of the source and the drain of the transistor 105 is electrically connected to the wiring 129. Therefore, discharging at a constant potential and charging corresponding to the pulse-signal are performed in the node A, whereby a dedicated circuit for PWM control can be obtained.

<Effect>

Figure 12A:
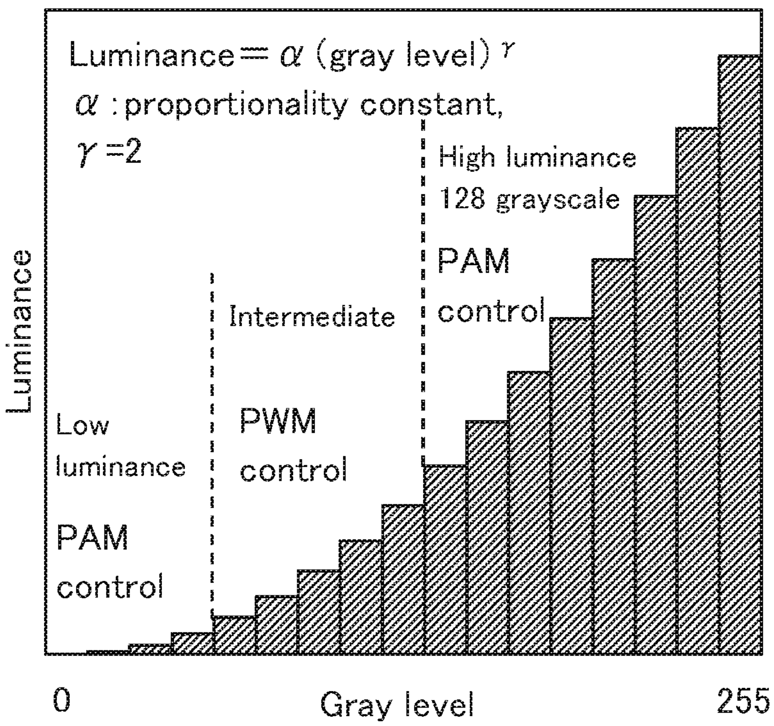
FIG. 12A is a diagram showing a relation between a gray level and luminance.

FIG. 12A is a diagram illustrating a relation between a gray level (an input value: 8 bit) and luminance (an output value) in accordance with a γ-curve (γ value=2). In the pixel 10*a* and the pixel 10*b* of one embodiment of the present invention, the input/output shown in FIG. 12A can be performed, and the operation method can be switched in a desired range of the gray level.

For example, the operation is performed by PAM control in the low luminance 32-level grayscale (luminance corresponding to 0 to 31-level grayscale) and the high luminance 128-level grayscale (luminance corresponding to 128 to 255-level grayscale), and the operation is performed by PWM control in the intermediate 96-level grayscale (luminance corresponding to 32 to 127-level grayscale). The operation enables the display of an image with reduced chromaticity variation. Note that the operation method and the timing of the switching are not limited thereto and can be set as desired. The operation may also be performed using either PAM control or PWM control throughout the entire range.

Figure 12B:
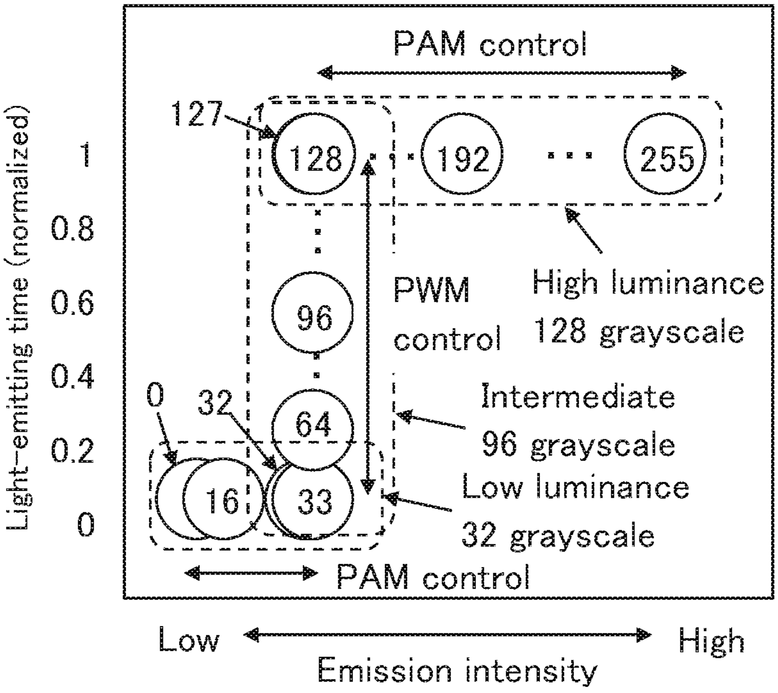
FIG. 12B is a diagram illustrating an operation corresponding to luminance using an emission intensity and an emission time of a light-emitting device.

FIG. 12B is a diagram describing the above operation using the emission intensity and the light-emitting time of the light-emitting device. The values shown inside markers or indicated by arrows represent input values of the gray level.

In the low luminance 32-level grayscale, PAM control operation is performed during first light-emitting time which is relatively short. In PAM control, the emission intensity of the light-emitting device can be controlled by controlling the amplitude, and thus the control in the low-luminance, which is difficult by PWM control, can also be accurately performed.

In the intermediate 96-level grayscale, the light emission of the light-emitting device is performed by PWM control operation, in which the width of the pulse signal is changed with constant, medium emission intensity. In the intermediate 96-level grayscale, a very short light emitting period (a pulse signal having a very short width) is not necessarily used; thus, the control is performed without any problems even by PWM control.

In the high luminance 128-level grayscale, PAM control operation is performed with the second light-emitting time which is relatively long.

Figure 13A:
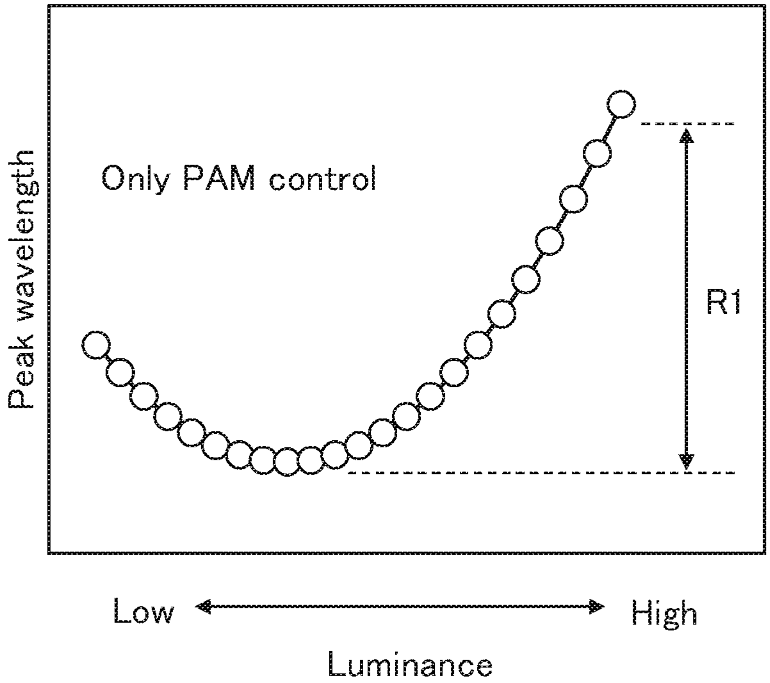
FIG. 13A and FIG. 13B are diagrams each illustrating a range of chromaticity variation.

FIG. 13A is a diagram describing an example of a change in the peak wavelength when the luminance of the light-emitting device is changed in PAM control. The difference between the minimum value and the maximum value in such characteristics is the range of chromaticity variation (R1). When the emission operation is performed by PAM control from low luminance to high luminance, the chromaticity variation increases and the display quality decreases in some cases.

Figure 13B:
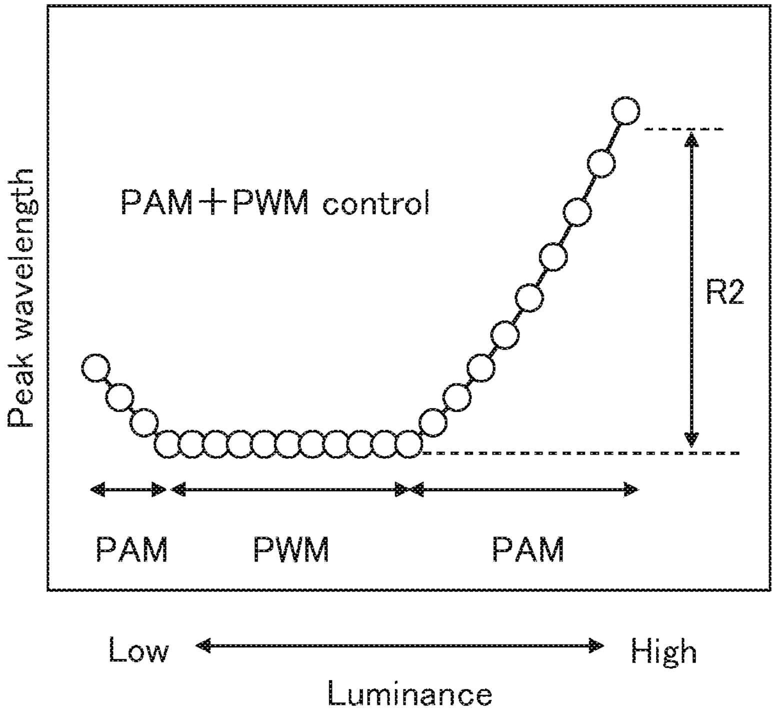

FIG. 13B is a diagram describing an example of a change in the peak wavelength of luminance of the light-emitting device when the operation described with reference to FIG. 12A and FIG. 12B is performed. Since PWM control is performed in the range in the vicinity of the minimum value in FIG. 13A, the peak wavelength in the range can be flat. Accordingly, the range of chromaticity variation (R2) can be smaller than R1. That is, the operation described above as an example performed with the use of the display device of one embodiment of the present invention can mitigate a reduction in display quality.

Figure 14A:
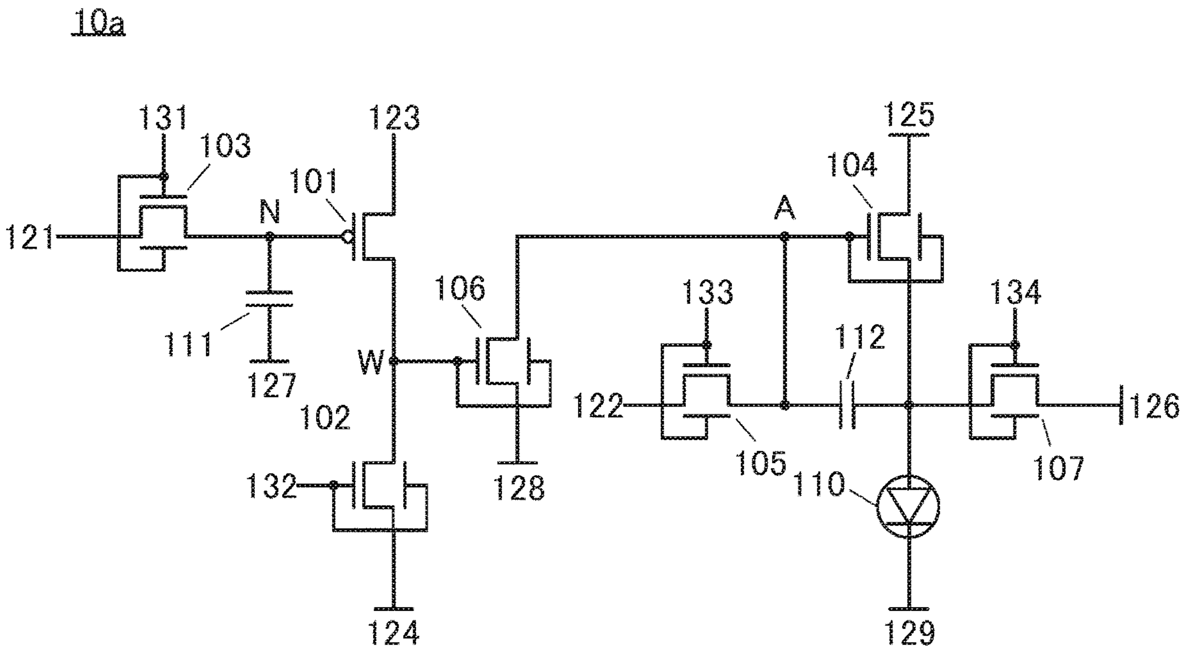
FIG. 14A and FIG. 14B are diagrams each illustrating a pixel circuit.
Figure 14B:
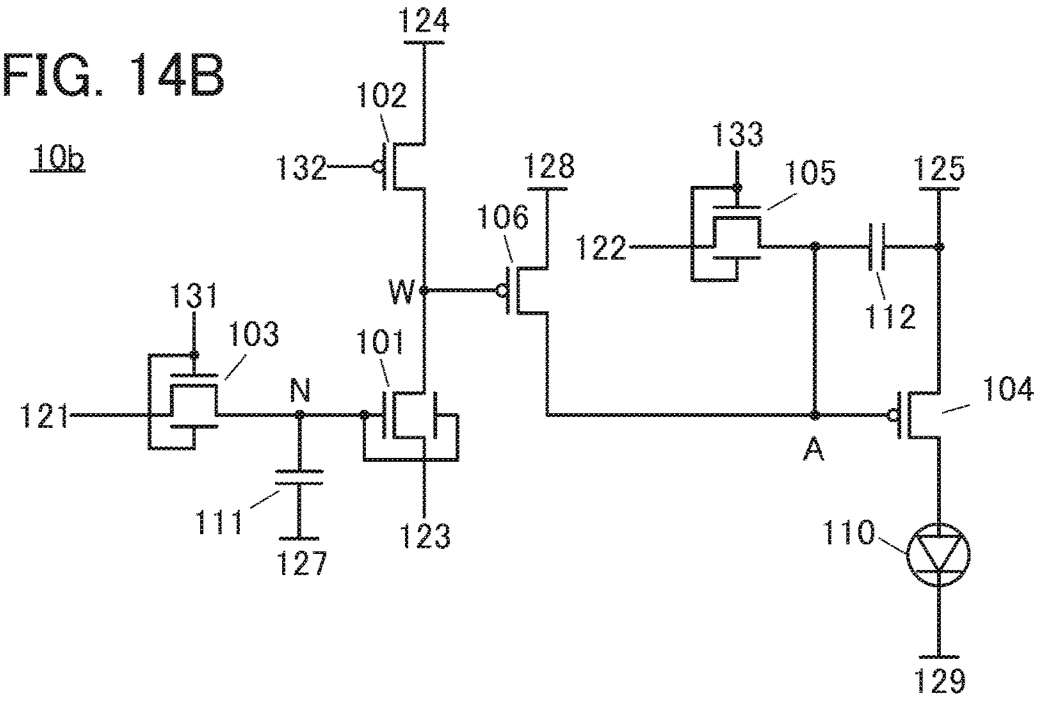

Note that in the configuration of the pixel 10*a* and the pixel 10*b*, in the case where OS transistors are used as the n-channel transistors, a configuration with a back gate as illustrated in FIG. 14A or FIG. 14B may be employed. Supplying the same potential to the back gate and a front gate can increase on-state current. Alternatively, a configuration may be employed in which the back gates can be supplied with a constant potential. Supplying a constant potential to the back gate can control the threshold voltage.

Figure 15:
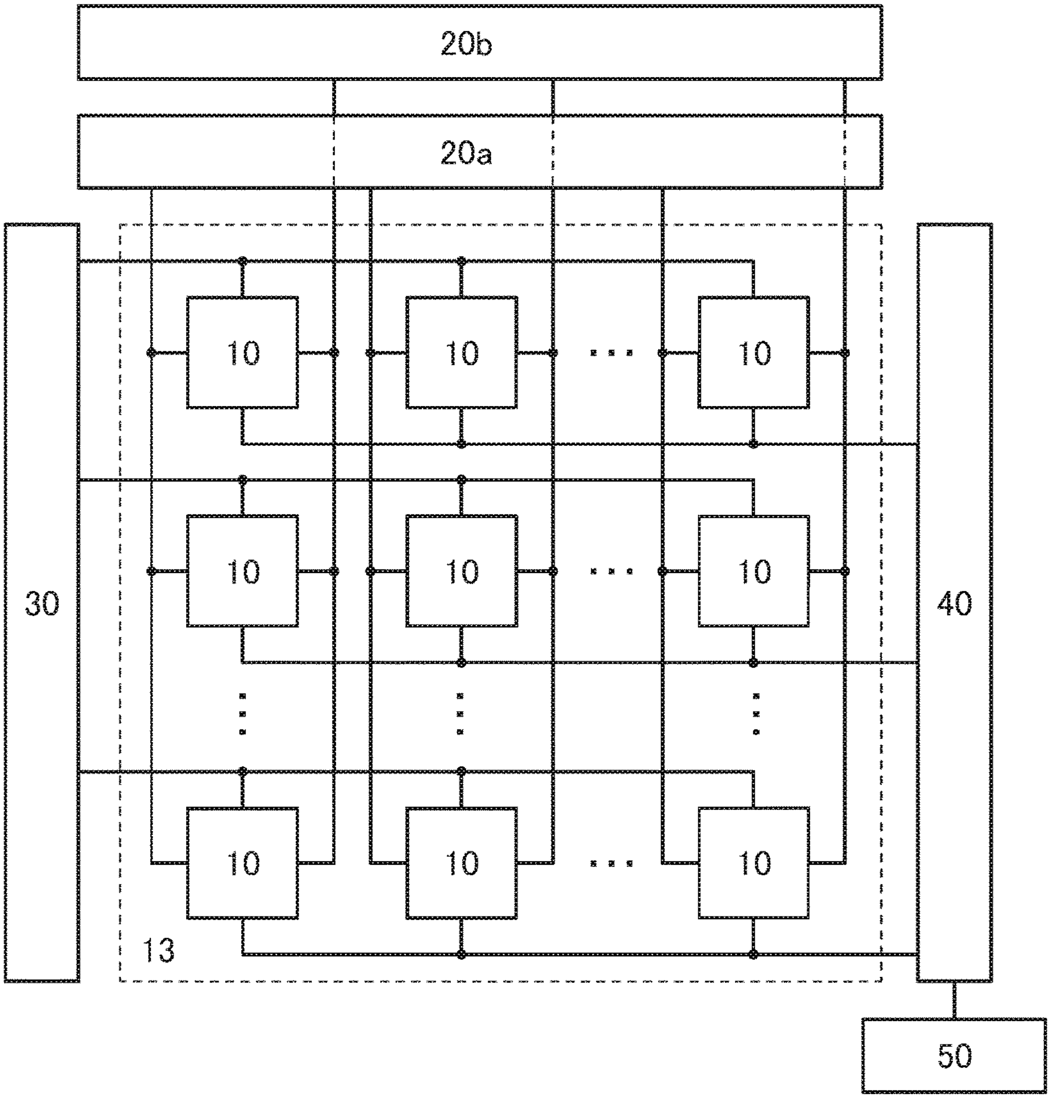
FIG. 15 is a block diagram illustrating a display device.

FIG. 15 is a block diagram illustrating a display device of one embodiment of the present invention. The display device includes a pixel array 13, a first source driver 20*a*, a second source driver 20*b*, and a gate driver 30. The pixel array 13 includes pixels 10 arranged in a column direction and a row direction. The pixel 10*a* or the pixel 10*b* described in this embodiment can be used as each of the pixels 10. Note that wirings are illustrated in a simplified way in the drawing, and the wirings connected to the components of the pixel 10 of one embodiment of the present invention are provided.

A slope potential supply circuit 40 is provided and electrically connected to the pixel 10. The slope potential supply circuit 40 is electrically connected to a slope potential generation circuit 50.

A sequential circuit such as a shift register can be used for the first source driver 20*a*, the second source driver 20*b*, the gate driver 30, and the slope potential supply circuit 40. The first source driver 20*a* can supply the potential DATAW to the pixel 10. The second source driver 20*b* can supply the potential DATAA to the pixel 10.

The first source driver 20*a*, the second source driver 20*b*, the gate driver 30, and the slope potential supply circuit 40 can be formed in the layer 310 illustrated in FIG. 2A and FIG. 2B. Alternatively, the first source driver 20*a*, the second source driver 20*b*, the gate driver 30, and the slope potential supply circuit 40 can be provided over an IC chip which is attached by a COF (chip on film) method, a COG (chip on glass) method, a TCP (tape carrier package) method, or the like.

Although an example in which the gate driver 30 is placed on one side of the pixel array 13 is illustrated, two gate drivers 30 may be placed to face each other with the pixel array 13 therebetween to divide driving rows.

<Simulation>

Figure 16:
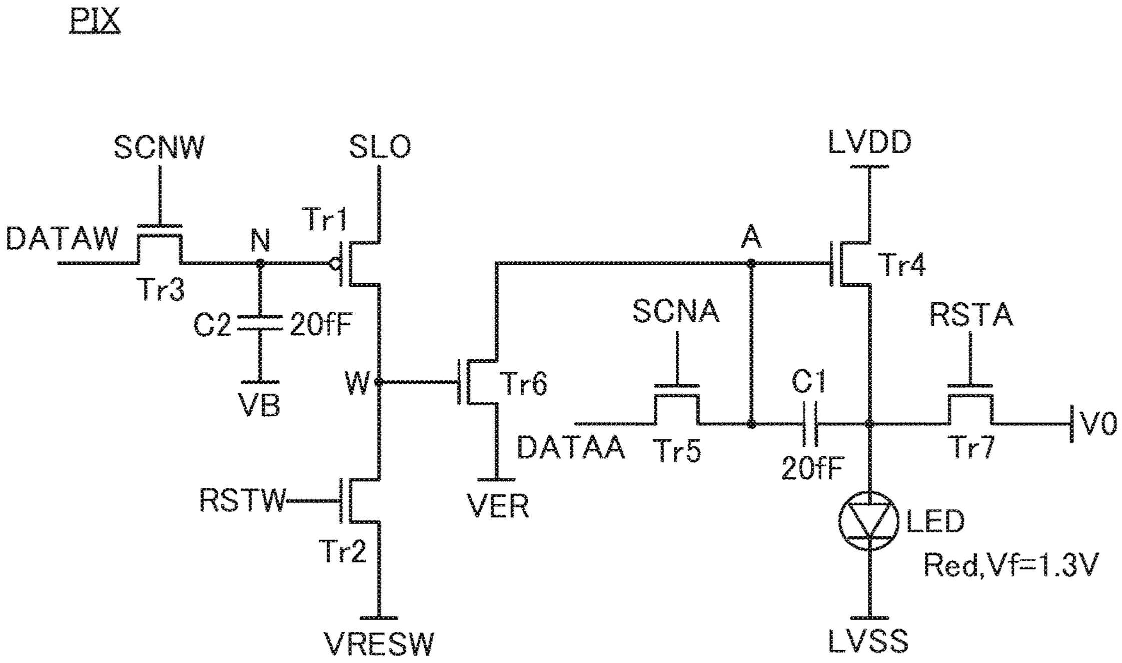
FIG. 16 is a diagram illustrating a pixel circuit used for simulation.

Next, simulation results of pixel operations are described. FIG. 16 illustrates a configuration of a pixel PIX used in the simulation. The pixel PIX has a structure similar to that of the pixel circuit illustrated in FIG. 1. The transistor Tr1 is a p-channel Si transistor and the transistors Tr2 to Tr7 are n-channel OS transistors. FIG. 16 illustrates potentials supplied to the wirings.

Each parameter used in the simulation is as follows. The transistor size is W/L=3 μm/3 μm (transistors Tr1, Tr2, Tr3, Tr5, and Tr7) or W/L=3 μm/6 μm (transistors Tr4 and Tr6).

The capacitance values of capacitors C1 and C2 are each 20 fF, potentials of the wirings connected to the gate of the transistors Tr2, Tr3, Tr5, and Tr7 (RSTW, SCNW, SCNA, and RSTA) are +12 V as "H" and −7 V as "L", a power supply voltage (LVDD) is +20 V, a power supply voltage (LVSS) is −5 V, a potential V0 and a potential VB are 0 V, the potential VER and the potential VRESW are −5 V, the slope potential (SLO) is 0 V to 10 V, and the light emitting-device is a μLED that emits red light and in which Vf=1.3 V. Note that SPICE is used as circuit simulation software.

Figure 17A:
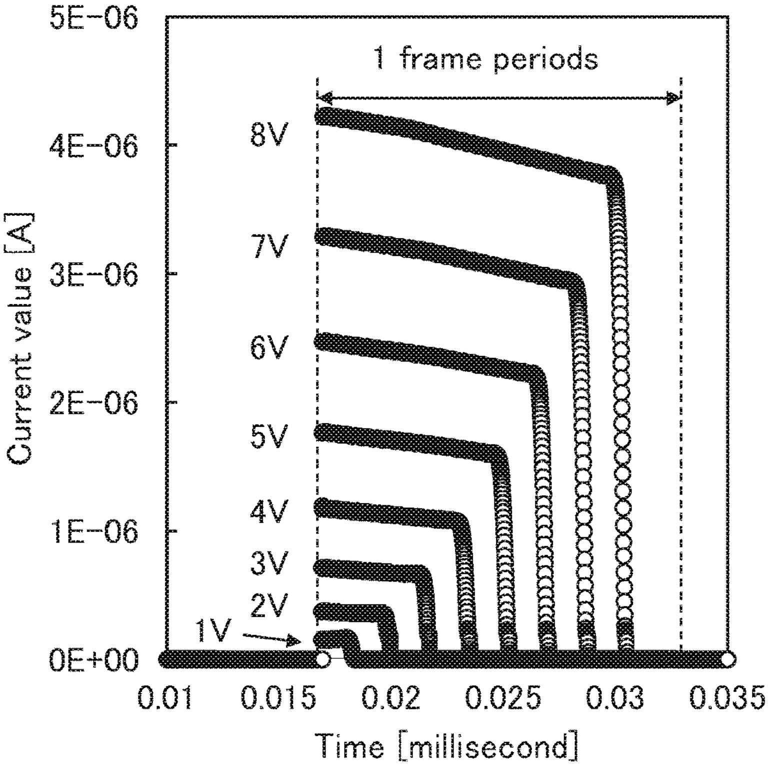
FIG. 17A and FIG. 17B are diagrams each showing a simulation result.

FIG. 17A shows simulation results of current flowing through the light-emitting device (LED) when the potential DATAW and the potential DATAA input to the pixel PIX in one frame period are +1 V to +8 V (1V step). The horizontal axis represents time (milliseconds), and the case where the slope potential (SLO) changes from the minimum value to the maximum value within one frame period is assumed.

From the above result, it was confirmed that the current value increases and the light-emitting period becomes longer as the value of the potential DATAW and the potential DATAA increases. That is, it was confirmed that PAM+PWM control (a pulse width control involving changes in amplitude) is possible.

Figure 17B:
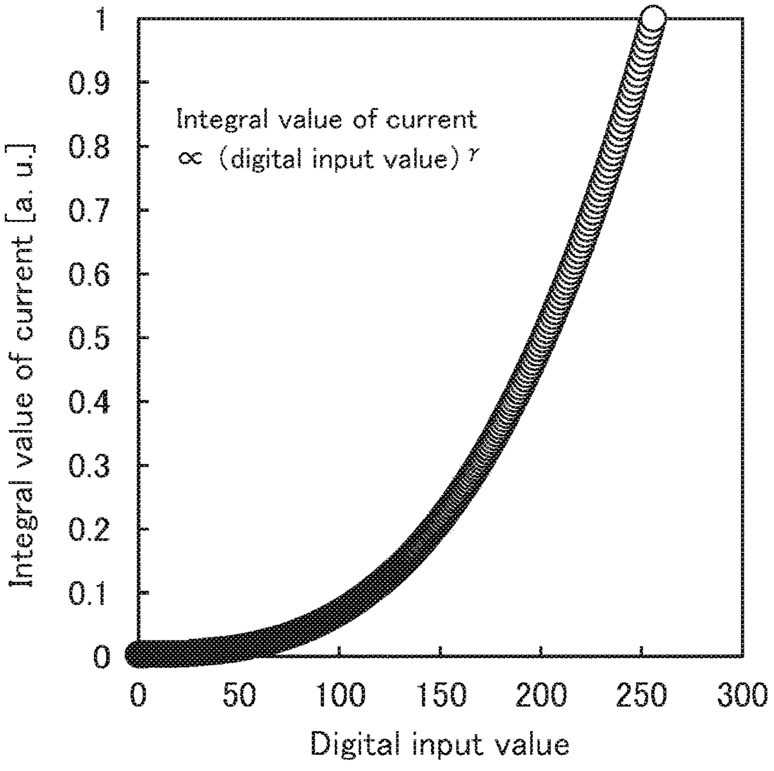

FIG. 17B is a graph in which the current integral value with respect to the digital input value is plotted. The digital input value corresponds to a gray level, and the current integral value corresponds to luminance. Since the curve of the current integral value is proportional to the γ-th power of digital input value (here, γ=3 since DATAW=DATAA), it was confirmed that input/output in accordance with γ-curve is possible.

From the above simulation results, the effect of one embodiment of the present invention can be confirmed.

This embodiment can be implemented in an appropriate combination with the structures described in the other embodiments.

Embodiment 2

In this embodiment, a stacked structure of a display device of one embodiment of the present invention illustrated in FIG. 2A and FIG. 2B is described.

Figure 18A:
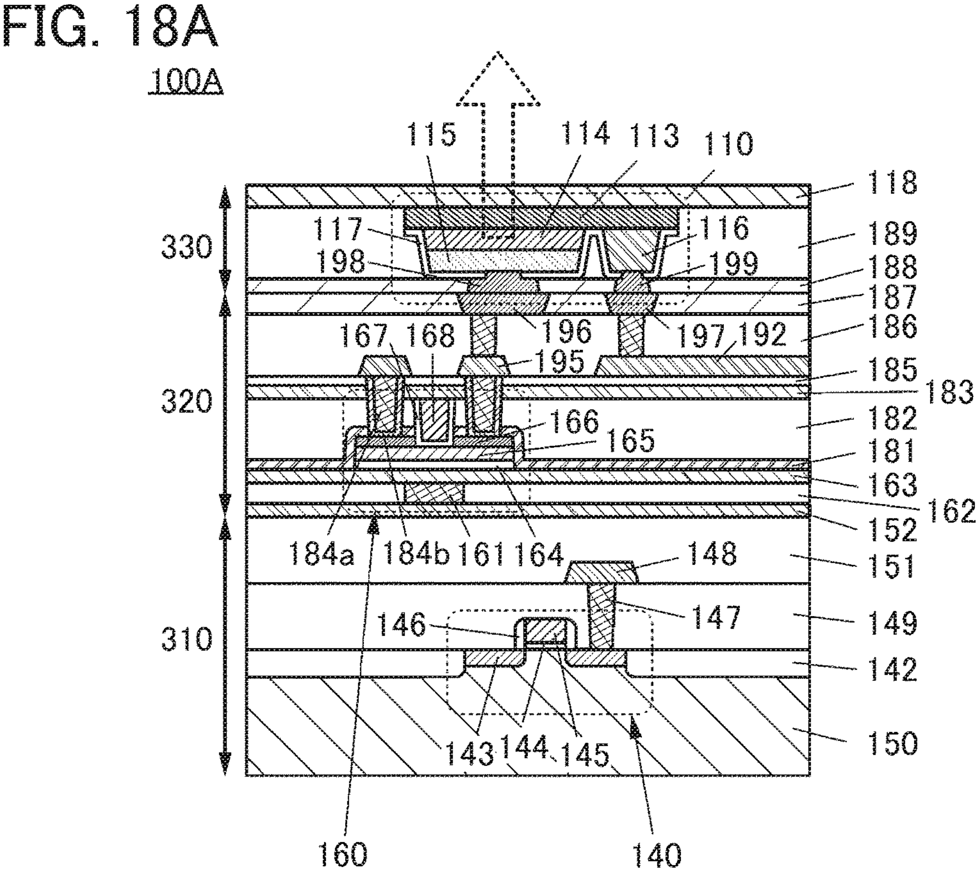
FIG. 18A and FIG. 18B are diagrams each illustrating a display device.

FIG. 18A is a cross-sectional view of a display device 100A of one embodiment of the present invention. The display device 100A has a structure in which a layer 310 provided with a transistor included in a driver circuit or the like in a pixel circuit, a layer 320 provided with a transistor, a wiring, and the like included in the pixel circuit, and a layer 330 provided with a light-emitting device such as an LED included in the pixel circuit are stacked in this order.

Although the display device is divided into a plurality of layers for convenience of the description in this embodiment, the boundaries between the layers are not strictly defined. For example, in the case where a component described as a component of the layer 310 is positioned in the vicinity of the boundary between the layer 310 and the layer 320, the component can also be regarded as a component of the layer 320. Furthermore, the component may be positioned in a layer other than the layer 310 unless the function of the component is hindered. Moreover, in one embodiment of the present invention, if needed, an insulating layer and a conductive layer may be provided in addition to the insulating layers and the conductive layers included in the respective layers. Alternatively, some of the insulating layers and the conductive layers included in the respective layers may be omitted if needed.

For example, the layer 310 includes a transistor 140 that is a component of the driver circuit (one or both of a gate driver and a source driver) of the pixel circuit, a memory circuit, an arithmetic circuit, and the like. The transistor 140 needs to operate at high speed, and thus a transistor including silicon (single crystal silicon, polycrystalline silicon, amorphous silicon, or the like) in a channel formation region (hereinafter, Si transistor) is preferably used. FIG. 18A illustrates an example in which single crystal silicon is used for a substrate 150, and the transistor 140 includes a channel formation region in the substrate 150.

Note that part of the driver circuit of the pixel circuit may be provided in an external IC chip connected to the pixel circuit.

The transistor 140 includes a conductive layer 145, an insulating layer 144, an insulating layer 146, and a pair of low-resistance regions 143. The conductive layer 145 functions as a gate. The insulating layer 144 is positioned between the conductive layer 145 and the substrate 150 and functions as a gate insulating layer. The insulating layer 146 is provided to cover the side surface of the conductive layer 145 and functions as a sidewall. The pair of low-resistance regions 143 are regions doped with an impurity in the substrate 150; one of them functions as a source of the transistor and the other functions as a drain of the transistor. Furthermore, an element isolation layer 142 is provided around the transistor.

An insulating layer 149 is provided to cover the transistor 140, and a conductive layer 148 is provided over the insulating layer 149. A conductive layer 147 is embedded in an opening portion provided in the insulating layer 149. The conductive layer 148 is electrically connected to one of the pair of low-resistance regions 143 through the conductive layer 147. An insulating layer 151 is provided to cover the conductive layer 148. The conductive layer 148 functions as a wiring. The wiring can electrically connect any of another transistor of the circuit including the transistor 140 as a component, the pixel circuit, another circuit, and the like to each other.

The layer 320 includes a transistor 160 that is a component of the pixel circuit, an insulating layer 152, an insulating layer 162, an insulating layer 163, an insulating layer 181, an insulating layer 182, an insulating layer 183, a conductive layer 184*a*, a conductive layer 184*b*, an insulating layer 185, an insulating layer 186, an insulating layer 187, a conductive layer 192, a conductive layer 195, a conductive layer 196, and a conductive layer 197. One or more of these components are sometimes considered as components of a transistor, but are not regarded as components of a transistor in the description in this embodiment. Note that each of the conductive layers and the insulating layers included in the layer 320 is not limited to a single-layer structure and may be a stacked-layer structure.

The insulating layer 152 is provided over the layer 310. The insulating layer 152 functions as a barrier layer that inhibits diffusion of impurities such as water and hydrogen from the layer 310 into the transistor 160 and release of oxygen from a metal oxide layer 165 of the transistor 160 to the insulating layer 310 side. As the insulating layer 152, for example, a film through which hydrogen and oxygen are less likely to diffuse than through a silicon oxide film, such as an aluminum oxide film, a hafnium oxide film, or a silicon nitride film, can be used.

The transistor 160 includes a conductive layer 161, an insulating layer 163, an insulating layer 164, the metal oxide layer 165, a pair of conductive layers 166, an insulating layer 167, a conductive layer 168, and the like.

The transistor 160 is preferably a transistor including the metal oxide layer 165 in a channel formation region (hereinafter, OS transistor). The metal oxide layer 165 includes a first region overlapping with one of the pair of conductive layers 166, a second region overlapping with the other of the pair of conductive layers 166, and a third region between the first region and the second region.

An OS transistor does not require a bonding step or the like and can be formed in a region overlapping with a Si transistor with an insulating layer and the like therebetween. Accordingly, a stacked-type device can be manufactured in a simple process and manufacturing cost can be reduced.

An OS transistor has characteristics of capability of high speed operation owing to high mobility, high reliability, and the like as compared with a transistor using amorphous silicon. A metal oxide used for an OS transistor can be formed in a deposition step, so that a laser apparatus and the like required for the crystallization step of polycrystalline silicon may be omitted. Accordingly, a highly reliable display device can be manufactured at a low cost with an OS transistor.

The conductive layer 161 and the insulating layer 162 are provided over the insulating layer 152, and the insulating layer 163 is provided to cover the conductive layer 161 and the insulating layer 162. The insulating layer 164 is provided over the insulating layer 163, and the metal oxide layer 165 is provided over the insulating layer 164.

The conductive layer 161 functions as a gate electrode, and the insulating layer 163 and the insulating layer 164 function as gate insulating layers. The conductive layer 161 includes a region overlapping with the metal oxide layer 165 with the insulating layer 163 and the insulating layer 164 therebetween. Like the insulating layer 152, the insulating layer 163 is preferably formed using a material that functions as a barrier layer. As the insulating layer 164 in contact with the metal oxide layer 165, an oxide insulating film such as a silicon oxide film is preferably used.

The pair of conductive layers 166 are provided over the metal oxide layer 165 to be apart from each other. One of the pair of conductive layers 166 functions as a source of the transistor and the other functions as a drain. The insulating layer 181 is provided to cover the metal oxide layer 165 and the pair of conductive layers 166, and the insulating layer 182 is provided over the insulating layer 181.

An opening portion reaching the metal oxide layer 165 is provided in the insulating layer 181 and the insulating layer 182, and the insulating layer 167 and the conductive layer 168 are embedded in the opening portion. The opening portion is provided in a position overlapping with the third region of the metal oxide layer 165. The insulating layer 167 includes a region overlapping with the side surface of the insulating layer 181 and the side surface of the insulating layer 182. The conductive layer 168 includes a region overlapping with the side surface of the insulating layer 181 and the side surface of the insulating layer 182 with the insulating layer 167 therebetween.

The conductive layer 168 functions as a gate electrode, and the insulating layer 167 functions as a gate insulating layer. The conductive layer 168 includes a region overlapping with the metal oxide layer 165 with the insulating layer 167 therebetween.

The insulating layer 183 and the insulating layer 185 are provided to cover the top surfaces of the insulating layer 182, the insulating layer 167, and the conductive layer 168.

Like the insulating layer 152, the insulating layer 181 and the insulating layer 183 are each preferably formed using a material that functions as a barrier layer. When the pair of conductive layers 166 is covered with the insulating layer 181, oxidation of the pair of conductive layers 166 due to oxygen contained in the insulating layer 182 can be inhibited.

A plug electrically connected to one of the pair of conductive layers 166 and the conductive layer 195 is embedded in an opening portion provided in the insulating layer 181, the insulating layer 182, the insulating layer 183, and the insulating layer 185. The plug can include a conductive layer 184*b* in contact with the side surface of the opening portion and the top surface of one of the pair of conductive layers 166, and a conductive layer 184*a* embedded inside the conductive layer 184*b*. The conductive layer 184*b* is preferably formed using a conductive material through which hydrogen and oxygen are less likely to diffuse.

The conductive layer 192, the conductive layer 195, and the insulating layer 186 are provided over the insulating layer 185. The conductive layer 196, the conductive layer 197, and the insulating layer 187 are provided over the insulating layer 186. The conductive layer 195 is electrically connected to the conductive layer 196 through a plug. The conductive layer 192 is electrically connected to the conductive layer 197 through a plug.

Here, the insulating layer 186 can have a planarization function. The insulating layer 187, the conductive layer 196, and the conductive layer 197 function as bonding layers. The conductive layer 196 and the conductive layer 197 each include a region embedded in the insulating layer 187.

The layer 330 includes the light-emitting device 110 provided over a support layer 118. The side surface of the light-emitting device 110 is sealed with the insulating layer 189, and an insulating layer 188, a conductive layer 198, and a conductive layer 199 are provided over the top surface of the light-emitting device 110. The conductive layer 198 is electrically connected to one electrode of the light-emitting device 110, and the conductive layer 199 is electrically connected to the other electrode of the light-emitting device 110. As the insulating layer 189, an insulating resin layer and the like is preferably used.

Here, the insulating layer 188, the conductive layer 198, and the conductive layer 199 function as bonding layers. The conductive layer 198 and the conductive layer 199 each include a region embedded in the insulating layer 188.

The surface of the layer 330 (the insulating layer 188, the conductive layer 198, and the conductive layer 199) is bonded to the surface of the layer 320 (the insulating layer 187, the conductive layer 196, and the conductive layer 197). Here, the insulating layer 188 is bonded and connected to the insulating layer 187. The conductive layer 198 and the conductive layer 196 are bonded, connected, and electrically connected to each other. The conductive layer 199 and the conductive layer 197 are bonded, connected, and electrically connected to each other.

The insulating layer 188 and the insulating layer 187 are preferably formed of the same component. Furthermore, the conductive layer 198 and the conductive layer 196 are preferably composed of metals whose main components are the same. Furthermore, the conductive layer 199 and the conductive layer 197 are preferably composed of metals whose main components are the same.

For example, the insulating layers 187 and 188 are preferably formed using a single layer or a stack including one or more of inorganic insulating materials such as silicon oxide, silicon oxynitride, silicon nitride oxide, silicon nitride, aluminum oxide, hafnium oxide, and titanium nitride.

Copper, aluminum, tin, zinc, tungsten, silver, platinum, gold, or the like can be used for the conductive layers 196 to 199. Copper, aluminum, tungsten, or gold is preferably used in terms of ease of bonding.

The transistor 160 can be used as a transistor included in the pixel circuit. The transistor 140 can be used as a transistor included in the driver circuit (e.g., one or both of a gate driver and a source driver) for driving the pixel circuit. Note that the transistor 140 may be a transistor included in the pixel circuit. Moreover, the transistors 140 and 160 can also be used as transistors included in a variety of circuits such as an arithmetic circuit, a memory circuit, and the like.

With such a structure, not only the components such as the transistor included in the pixel circuit but also the components such as the transistor included in the driver circuit can be formed directly under the light-emitting device; thus, the display device can be downsized as compared with the case where the driver circuit is provided outside a display portion. In addition, the display device can have a narrow bezel (narrow non-display region).

The light-emitting device 110 includes a semiconductor layer 113, a light-emitting layer 114, and a semiconductor layer 115, which are provided in this order over the support layer 118. A conductive layer 116 is provided over the semiconductor layer 113. The stack of the light-emitting layer 114 and the semiconductor layer 115 and the conductive layer 116 are covered with the insulating layer 117. The semiconductor layer 115 is electrically connected to the conductive layer 198 through a first opening portion provided in the insulating layer 117. The conductive layer 116 is electrically connected to the conductive layer 199 through a second opening portion provided in the insulating layer 117.

Gallium nitride or the like formed over a sapphire substrate by epitaxial growth method is used as the support layer 118, for example, and the semiconductor layer 113, the light-emitting layer 114, the semiconductor layer 115, the insulating layer 117, and the conductive layer 116 formed over the support layer 118 are processed to form a plurality of light-emitting devices 110. The plurality of light-emitting devices formed through the steps can be referred to as a light-emitting device formed with a monolithic structure.

Then, the insulating layer 189 and the bonding layer are formed over the light-emitting device 110, and the plurality of light-emitting devices 110 are bonded to the layer 320 in the same step. After that, a step of separating the sapphire substrate is performed and the structure illustrated as the display device 100A is formed.

The light-emitting layer 114 is positioned between the semiconductor layer 113 and the semiconductor layer 115. In the light-emitting layer 114, electrons and holes are combined to emit light. An n-type semiconductor layer can be used as one of the semiconductor layer 113 and the semiconductor layer 115, and a p-type semiconductor layer can be used as the other. An n-type semiconductor layer, an i-type semiconductor layer, or a p-type semiconductor layer can be used as the light-emitting layer 114.

A stacked-layer structure including the semiconductor layer 113, the light-emitting layer 114, and the semiconductor layer 115 is formed so as to emit red light, green light, blue light, bluish violet light, violet light, ultraviolet light, or the like. For the stacked-layer structure, for example, a compound containing a Group 13 element and a Group 15 element (also referred to as a Group III-V compound) can be used. Examples of the Group 13 element include aluminum, gallium, and indium. Examples of the Group 15 element include nitrogen, phosphorus, arsenic, and antimony.

For example, a pn junction or a pin junction is formed using a compound of gallium and phosphorus, a compound of gallium and arsenic, a compound of gallium, aluminum, and arsenic, a compound of aluminum, gallium, indium, and phosphorus, gallium nitride, a compound of indium and gallium nitride, a compound of selenium and zinc, or the like to form a light-emitting device emitting target light. Note that a compound other than the above may be also used.

The pn junction or the pin junction of the light-emitting device 110 may be not only a homojunction but also a heterojunction or a double heterojunction. Alternatively, a light-emitting device having a quantum well junction, a light-emitting device using a nanocolumn, or the like may be used.

A material such as gallium nitride can be used for a light-emitting device emitting light in the ultraviolet wavelength range to the blue wavelength range, for example. A material such as a compound of indium and gallium nitride can be used for a light-emitting device emitting light in the ultraviolet wavelength range to the green wavelength range. A material such as a compound of aluminum, gallium, indium, and phosphorus or a compound of gallium and arsenic can be used for a light-emitting device emitting light in the green wavelength range to the red wavelength range. A material such as a compound of gallium and arsenic can be used for a light-emitting device emitting light in the infrared wavelength range.

When the plurality of light-emitting devices 110 provided on the same plane emit light of different colors such as R (red), G (green), and B (blue), for example, a color image can be displayed.

Alternatively, all light-emitting devices 110 provided on the same plane may emit light of the same color. In this case, light emitted from the light-emitting layer 114 is extracted to the outside of the display device through one or both of a color conversion layer and a coloring layer. Such a structure will be described in detail in Embodiment 3.

The display device of this embodiment may include a light-emitting device emitting infrared light. The light-emitting device emitting infrared light can be used as a light source of an infrared light sensor, for example.

Figure 18B:
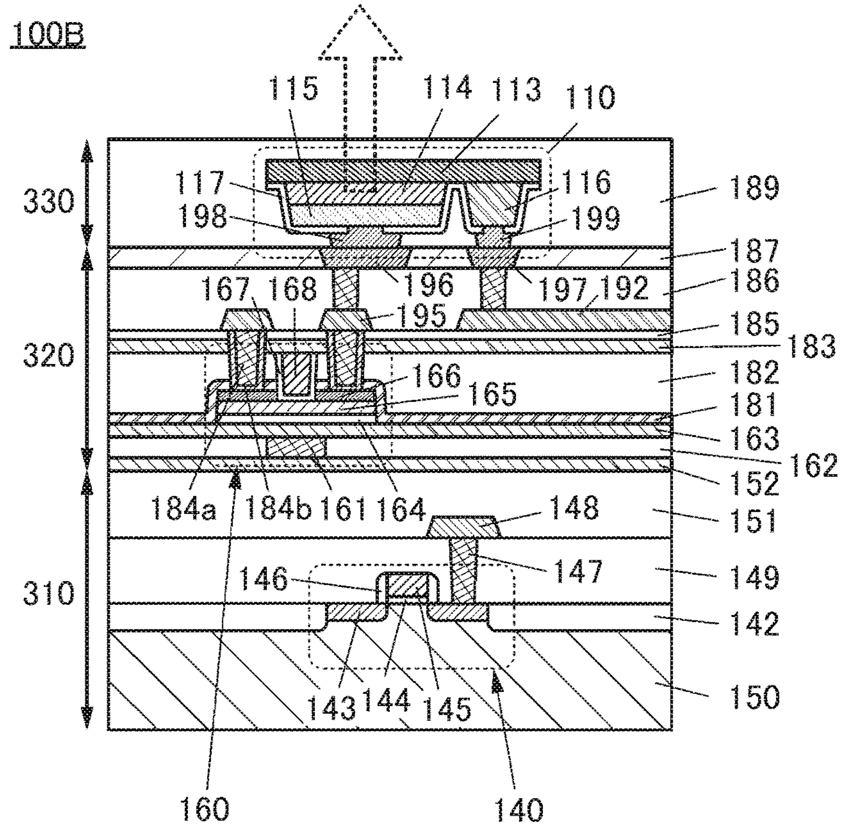

Although FIG. 18A illustrates the structure in which the layer 330 is bonded to the layer 320, the structure in which the single light-emitting device 110 is mounted using a flip-chip bonding or the like and sealed with the insulating layer 189 as in the display device 100B illustrated in FIG. 18B may be employed.

This embodiment can be implemented in an appropriate combination with the structures described in the other embodiments.

Embodiment 3

In this embodiment, a structure is described in which a color conversion layer is provided on the light-emission side of the light emitting device in the display device described in Embodiment 2. Note that detailed description of the same components as Embodiment 2 is omitted.

Figure 19:
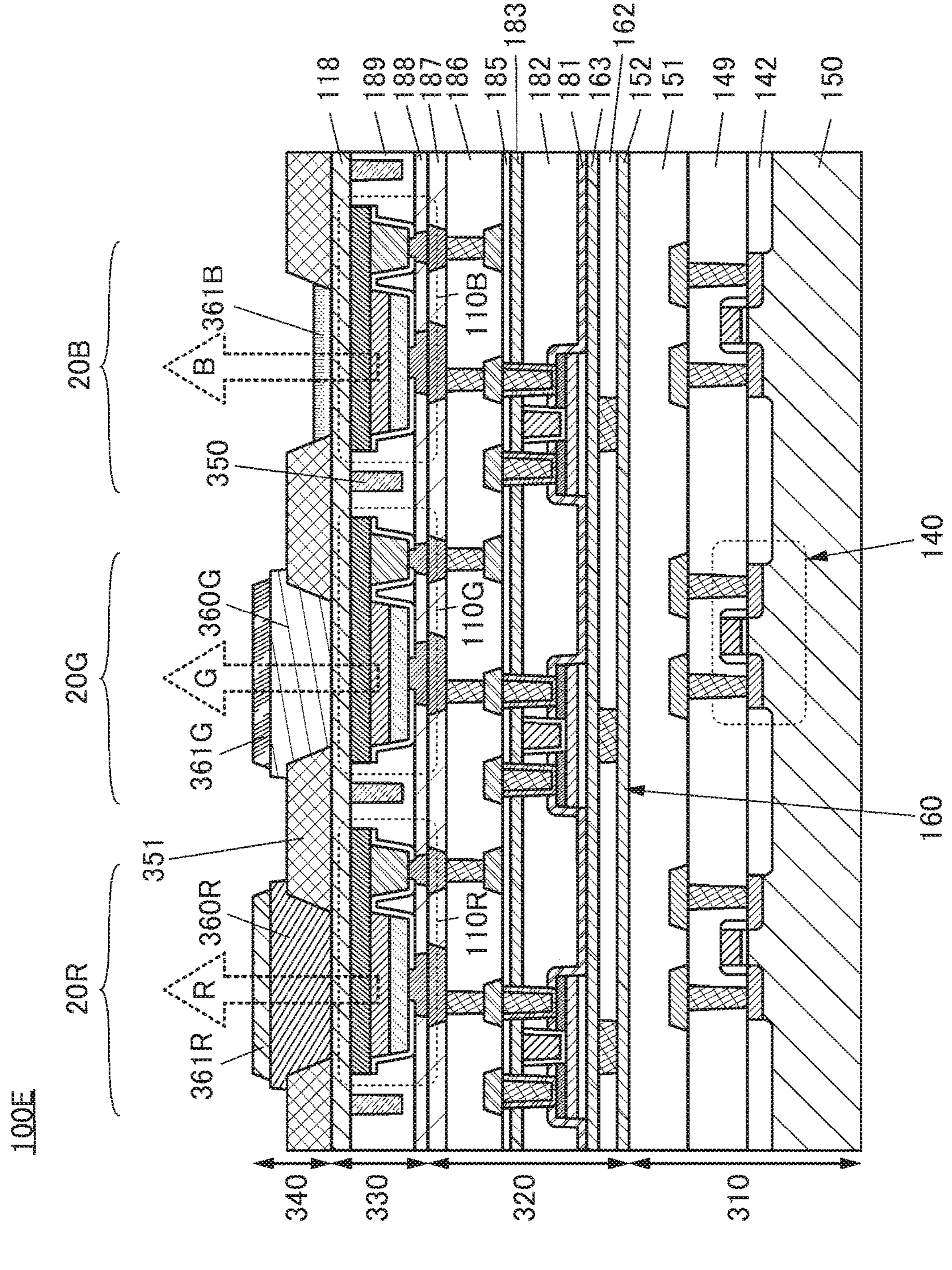
FIG. 19 is a diagram illustrating a display device.

FIG. 19 is a cross-sectional view of a display device 100E. The display device 100E includes a pixel 20R emitting red light, a pixel 20G emitting green light, and a pixel 20B emitting blue light. A layer 340 is provided over the layer 330 provided with the light-emitting device. A color conversion layer, a coloring layer, a light-blocking layer, and the like are provided in the layer 340.

The pixel 20R includes a light-emitting device 110R. The pixel 20G includes a light-emitting device 110G. The pixel 20B includes a light-emitting device 110B. The light-emitting device 110R, the light-emitting device 110G, and the light-emitting device 110B emit light of the same color. That is, the light-emitting device 110R, the light-emitting device 110G, and the light-emitting device 110B can have the same structure.

Specifically, the light-emitting device 110R, the light-emitting device 110G, and the light-emitting device 110B preferably emit blue light. In order to create a color image, pixels emitting light of three primary colors of red (R), green (G), and blue (B) can be used. In the display device described in this embodiment, a color conversion layer is used in a pixel, a color of light emitted from the light-emitting device is changed into a needed color, and the light is emitted to the outside. Here, with a light-emitting device emitting blue light, a color conversion layer is not needed in a pixel emitting blue light, and thus the manufacturing cost can be reduced.

A color conversion layer 360R and a coloring layer 361R are provided in the red pixel 20R in a region overlapping with the light-emitting device 110R. Light emitted from the light-emitting device 110R is converted from blue light to red light by the color conversion layer 360R, the purity of the red light is improved by the coloring layer 361R, and the light is emitted to the outside of the display device 100E. Note that the coloring layer 361R may be omitted.

A color conversion layer 360G and a coloring layer 361G are provided in the green pixel 20G in a region overlapping with the light-emitting device 110G. Light emitted from the light-emitting device 110G is converted from blue light into green light by the color conversion layer 360G, the purity of the green light is improved by the coloring layer 361G, and the light is emitted to the outside of the display device 100E. Note that the coloring layer 361G may be omitted.

A coloring layer 361B is provided in the blue pixel 20B in a region overlapping with the light-emitting device 110B. The purity of blue light emitted from the light-emitting device 110B is improved by the coloring layer 361B, and the light is emitted to the outside of the display device 100E. Note that the coloring layer 361B may be omitted. As described above, a color conversion layer can be omitted in the blue pixel 20B.

In the display device 100E, only one type of light-emitting device needs to be formed over a substrate; hence, a manufacturing apparatus and a manufacturing process can be simplified compared to the case where a plurality of types of light-emitting devices are formed.

A light-blocking layer 350 is provided between the pixels of respective colors. The light-blocking layer 350 is provided in a position in which at least light emitted from the light-emitting device 110 in the lateral direction is blocked. The light-blocking layer 350 may also be provided in a position in which light emitted from the light-emitting device 110 in the oblique direction is blocked, if needed. A light-blocking layer 351 covering the periphery of the pixels is provided over the support layer 118.

With the light-blocking layer 350 and the light-blocking layer 351, light emitted from the light-emitting device can be prevented from entering an adjacent pixel region of another color, and color mixing can be prevented. Consequently, the display quality of the display device can be improved. Note that either the light-blocking layer 350 or the light-blocking layer 351 may be provided.

There is no particular limitation on materials of the light-blocking layer 350 and the light-blocking layer 351; for example, an inorganic material such as a metal material or an organic material such as a resin containing a pigment (e.g., carbon black) or dye can be used. The light-blocking layer 351 may be formed by stacking coloring layers of respective colors. For example, the light-blocking layer 351 can be formed by staking coloring layers of three colors of red, green, and blue.

The light-emitting device 110R, the light-emitting device 110G, and the light-emitting device 110B may each emit light having a wavelength of a higher photon energy than that of blue light. For example, a light-emitting device emitting bluish violet light, violet light, ultraviolet light (UV light), or the like can be used. With the use of light having a high photon energy, color conversion can be performed efficiently by the color conversion layer.

Figure 20:
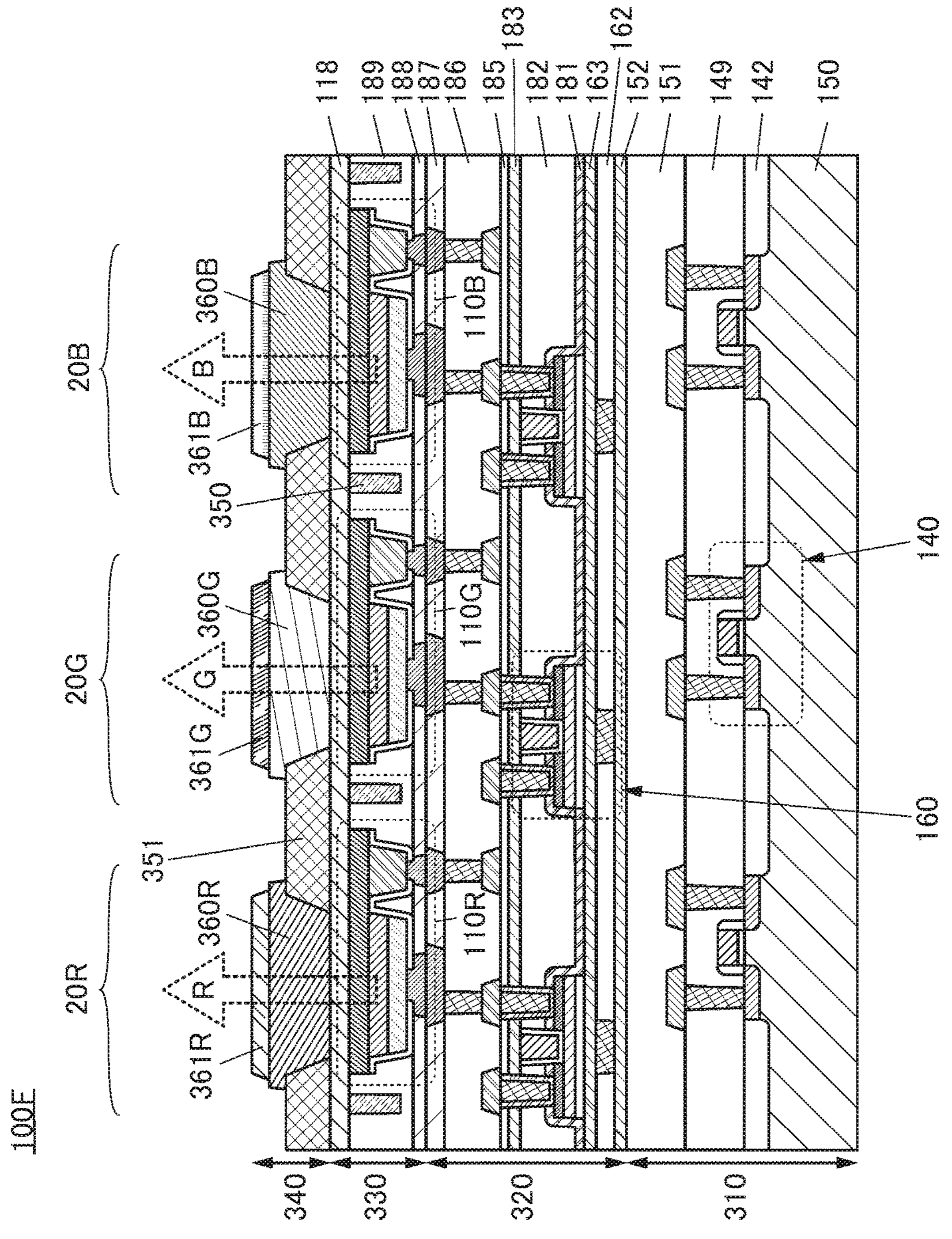
FIG. 20 is a diagram illustrating a display device.

In this case, a color conversion layer 360B and a coloring layer 361B are provided in the blue pixel 20B in a region overlapping with the light-emitting device 110B as in a display device 100F illustrated in FIG. 20. Light emitted from the light-emitting device 110B is converted from bluish violet light, violet light, or ultraviolet light to blue light by the color conversion layer 360B, the purity of the blue light is improved by the coloring layer 361B, and the light is emitted to the outside of the display device 100E. Note that the coloring layer 361B may be omitted.

For the color conversion layer, a phosphor or a quantum dot (QD) is preferably used. In particular, a quantum dot has an emission spectrum with a narrow peak width, whereby emission with high color purity can be obtained. Accordingly, the display quality of the display device can be improved.

The color conversion layer can be formed by a droplet discharge method (e.g., an inkjet method), a coating method, an imprinting method, a variety of printing methods (screen printing or offset printing), or the like. A color conversion film such as a quantum dot film may also be used.

For processing a film to be the color conversion layer, a lithography method can be employed. For example, a method can be employed in which a resist mask is formed over a thin film that is to be processed, the thin film is processed by etching or the like, and then the resist mask is removed. Alternatively, another method may be employed in which after a photosensitive thin film is formed, exposure and development are performed to process the thin film into a desired shape. For example, a thin film is formed using a photosensitive material in which a quantum dot is mixed, and the thin film is processed by a lithography method, whereby an island-shaped color conversion layer can be formed.

There is no particular limitation on a material of a quantum dot, and examples include a Group 14 element, a Group 15 element, a Group 16 element, a compound of a plurality of Group 14 elements, a compound of an element belonging to any of Group 4 to Group 14 elements and a Group 16 element, a compound of a Group 2 element and a Group 16 element, a compound of a Group 13 element and a Group 15 element, a compound of a Group 13 element and a Group 17 element, a compound of a Group 14 element and a Group 15 element, a compound of a Group 11 element and a Group 17 element, iron oxides, titanium oxides, spinel chalcogenides, and a variety of semiconductor clusters.

Specific examples include cadmium selenide; cadmium sulfide; cadmium telluride; zinc selenide; zinc oxide; zinc sulfide; zinc telluride; mercury sulfide; mercury selenide; mercury telluride; indium arsenide; indium phosphide; gallium arsenide; gallium phosphide; indium nitride; gallium nitride; indium antimonide; gallium antimonide; aluminum phosphide; aluminum arsenide; aluminum antimonide; lead selenide; lead telluride; lead sulfide; indium selenide; indium telluride; indium sulfide; gallium selenide; arsenic sulfide; arsenic selenide; arsenic telluride; antimony sulfide; antimony selenide; antimony telluride; bismuth sulfide; bismuth selenide; bismuth telluride; silicon; silicon carbide; germanium; tin; selenium; tellurium; boron; carbon; phosphorus; boron nitride; boron phosphide; boron arsenide; aluminum nitride; aluminum sulfide; barium sulfide; barium selenide; barium telluride; calcium sulfide; calcium selenide; calcium telluride; beryllium sulfide; beryllium selenide; beryllium telluride; magnesium sulfide; magnesium selenide; germanium sulfide; germanium selenide; germanium telluride; tin sulfide; tin selenide; tin telluride; lead oxide; copper fluoride; copper chloride; copper bromide; copper iodide; copper oxide; copper selenide; nickel oxide; cobalt oxide; cobalt sulfide; iron oxide; iron sulfide; manganese oxide; molybdenum sulfide; vanadium oxide; tungsten oxide; tantalum oxide; titanium oxide; zirconium oxide; silicon nitride; germanium nitride; aluminum oxide; barium titanate; a compound of selenium, zinc, and cadmium; a compound of indium, arsenic, and phosphorus; a compound of cadmium, selenium, and sulfur; a compound of cadmium, selenium, and tellurium; a compound of indium, gallium, and arsenic; a compound of indium, gallium, and selenium; a compound of indium, selenium, and sulfur; a compound of copper, indium, and sulfur; and combinations thereof. What is called an alloyed quantum dot whose composition is represented by a given ratio may also be used.

Examples of the quantum dot include a core-type quantum dot, a core-shell quantum dot, and a core-multishell quantum dot. Quantum dots have a high proportion of surface atoms and thus have high reactivity and easily aggregate together. To prevent aggregation of quantum dots and increase dispersiveness to a dispersion medium, it is preferable that a protective agent be attached to, or a protective group be provided on the surfaces of quantum dots. This can also reduce reactivity and improve electrical stability.

Since band gaps of quantum dots are increased as their sizes is decreased, the sizes is adjusted as appropriate so that light with a desired wavelength can be obtained. As the crystal size becomes smaller, light emission from the quantum dots is shifted to a blue color side, i.e., a high energy side; thus, the emission wavelengths of the quantum dots can be adjusted over a wavelength range of a spectrum of an ultraviolet region, a visible light region, and an infrared region by changing the sizes of quantum dots. The size (diameter) of the quantum dot is, for example, greater than or equal to 0.5 nm and less than or equal to 20 nm, preferably greater than or equal to 1 nm and less than or equal to 10 nm. The emission spectrum is narrowed as the size distribution of the quantum dots gets smaller, and thus light with high color purity can be obtained. The shape of the quantum dot is not particularly limited and may be a spherical shape, a rod shape, a circular shape, or other shapes. Quantum rods, which are rod-shaped quantum dots, have a function of emitting directional light.

The coloring layer is a colored layer that transmits light in a specific wavelength range. For example, a color filter that transmits light in a red, green, blue, or yellow wavelength range can be used. Examples of a material that can be used for the coloring layer include a metal material, a resin material, and a resin material containing a pigment or a dye.

Note that although the structure of the display device 100A is used for the basic structure of the display device 100E and the display device 100F as an example, the display device 100B described in Embodiment 2 can also be used.

This embodiment can be implemented in an appropriate combination with the structures described in the other embodiments.

Embodiment 4

In this embodiment, a display device of one embodiment of the present invention will be described with reference to FIG. 21A and FIG. 21B.

The display device of this embodiment can be a high-resolution display device. Accordingly, the display device of this embodiment can be used for display portions of information terminals (wearable devices) such as watch-type and bracelet-type information terminals and display portions of wearable devices capable of being worn on a head, such as a VR (Virtual Reality) device like a head-mounted display (HMD) and a glasses-type AR (Augmented Reality) device.

Figure 21A:
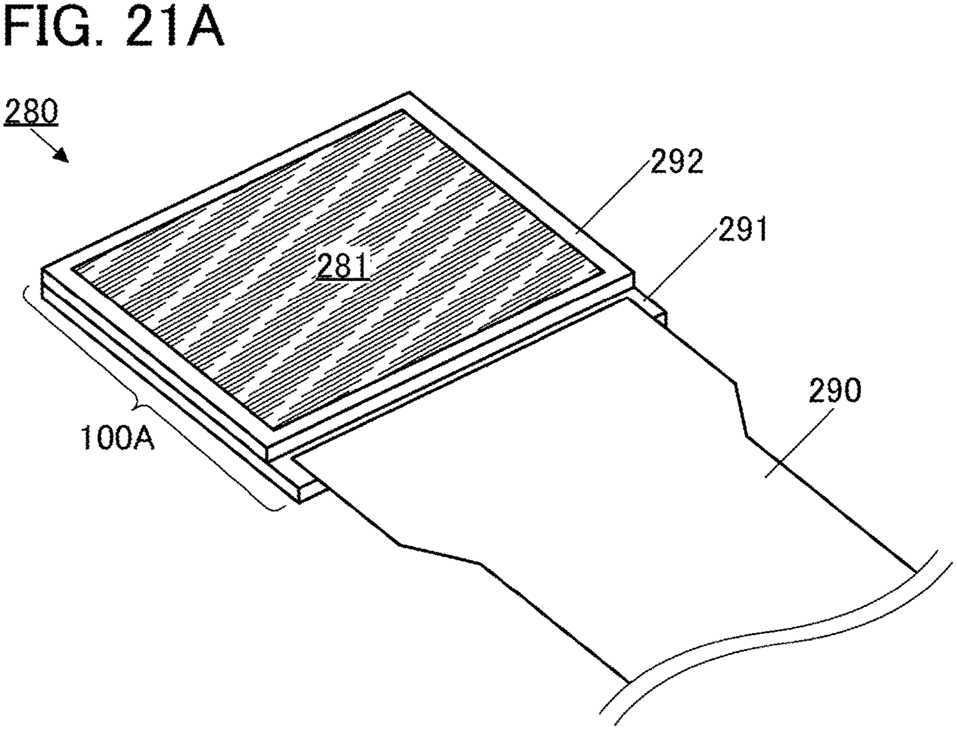
FIG. 21A and FIG. 21B are diagrams each illustrating a display device.

FIG. 21A is a perspective view of a display module 280. The display module 280 includes a display device 100A described in the above embodiment and an FPC 290. Note that the display device included in the display module 280 is not limited to the display device 100A and may be any of the display devices 100B, 100E, and 100F.

The display module 280 includes a substrate 291 and a substrate 292. The display module 280 includes a display portion 281. The display portion 281 is a region of the display module 280 where an image is displayed, and is a region where light emitted from pixels provided in a pixel portion 284 described later can be seen.

Figure 21B:
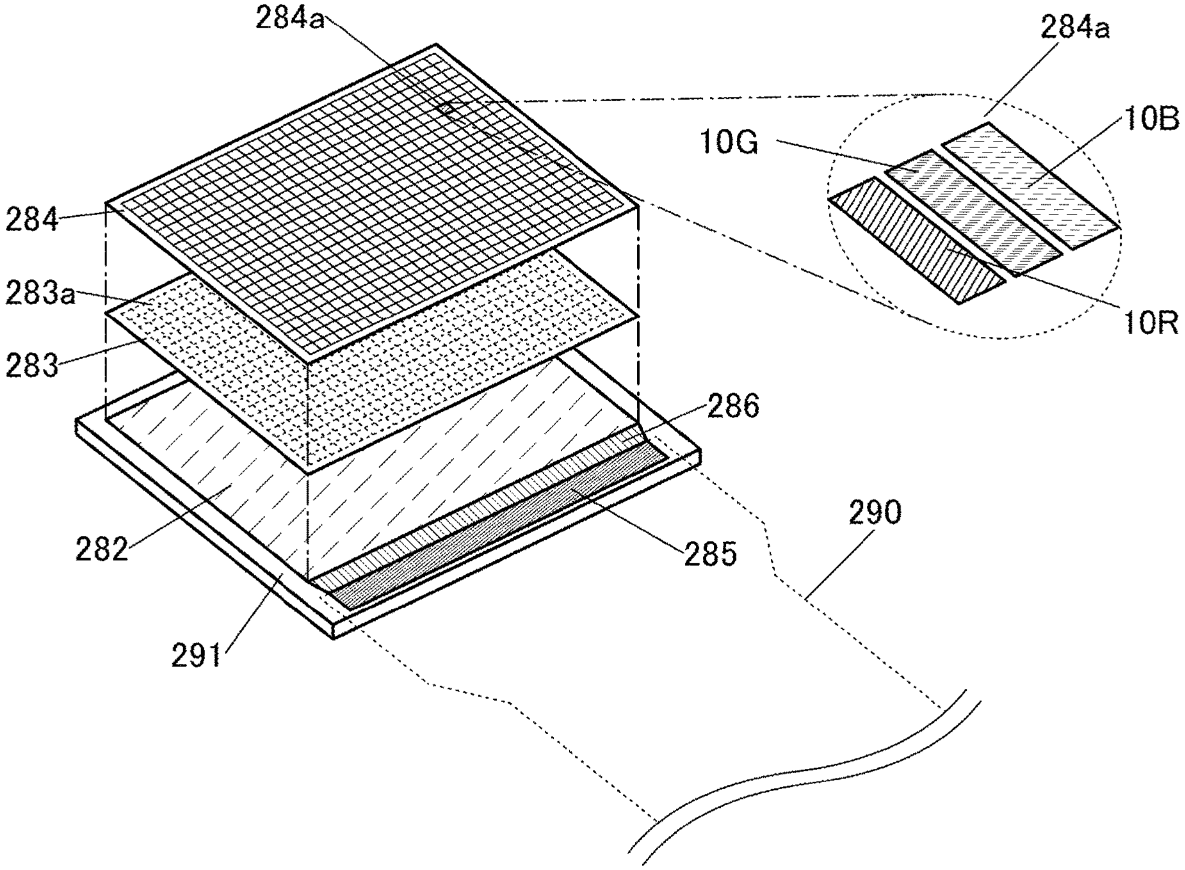

FIG. 21B is a perspective view schematically illustrating a structure on the substrate 291 side. Over the substrate 291, a circuit portion 282, a pixel circuit portion 283 over the circuit portion 282, and the pixel portion 284 over the pixel circuit portion 283 are stacked. A terminal portion 285 to be connected to the FPC 290 is provided over the substrate 291 in a portion that does not overlap with the pixel portion 284. The terminal portion 285 and the circuit portion 282 are electrically connected to each other through a wiring portion 286 formed of a plurality of wirings.

The pixel portion 284 includes a plurality of pixels 284*a* arranged periodically. An enlarged view of one pixel 284*a* is illustrated on the right side of FIG. 21B. The pixel 284*a* includes a plurality of subpixels emitting light of different colors (the subpixels 10R, 10G, and 10B). The subpixel can employ any of the structures of the pixels described in the above embodiments.

The pixel circuit portion 283 includes a plurality of pixel circuits 283*a* arranged periodically.

One pixel circuit 283*a* is a circuit that controls driving of a plurality of elements included in one pixel 284*a*. One pixel circuit 283*a* can be provided with three circuits each of which controls light emission of one light-emitting device. For example, the pixel circuit 283*a* can include at least one selection transistor, one current control transistor (driving transistor), and a capacitor for one light-emitting device. In this case, a gate signal is input to a gate of the selection transistor, and a source signal is input to a source of the selection transistor. Thus, an active-matrix display device is achieved.

The circuit portion 282 includes a circuit for driving the pixel circuits 283*a* in the pixel circuit portion 283. For example, one or both of a gate line driver circuit and a source line driver circuit are preferably included. In addition, at least one of an arithmetic circuit, a memory circuit, a power supply circuit, and the like may be included.

The FPC 290 functions as a wiring for supplying a video signal, a power supply potential, or the like to the circuit portion 282 from the outside. An IC may be mounted over the FPC 290.

The display module 280 can have a structure in which one or both of the pixel circuit portion 283 and the circuit portion 282 are provided to be stacked below the pixel portion 284; thus, the aperture ratio (effective display area ratio) of the display portion 281 can be significantly high. For example, the aperture ratio of the display portion 281 can be greater than or equal to 40% and less than 100%, preferably greater than or equal to 50% and less than or equal to 95%, and further preferably greater than or equal to 60% and less than or equal to 95%. Furthermore, the pixels 284*a* can be arranged extremely densely and thus, the display portion 281 can have an extremely high resolution. For example, the pixels 284*a* are preferably arranged in the display portion 281 with a resolution higher than or equal to 2000 ppi, preferably higher than or equal to 3000 ppi, further preferably higher than or equal to 5000 ppi, still further preferably higher than or equal to 6000 ppi, and lower than or equal to 20000 ppi or lower than or equal to 30000 ppi.

Such a display module 280 has extremely high resolution, and thus can be suitably used for a device for VR such as an HMD or a glasses-type device for AR. For example, even in the case of a structure in which the display portion of the display module 280 is perceived through a lens, pixels of the extremely-high-resolution display portion 281 included in the display module 280 are not perceived when the display portion is enlarged by the lens, so that display providing a high sense of immersion can be performed. Without being limited thereto, the display module 280 can be suitably used for electronic devices including a relatively small display portion. For example, the display module 280 can be suitably used in a display portion of a wearable electronic devices, such as a wrist watch.

This embodiment can be implemented in an appropriate combination with the structures described in the other embodiments.

Embodiment 5

In this embodiment, electronic devices of one embodiment of the present invention are described with reference to FIG. 22A to FIG. 22D.

Electronic devices of this embodiment each include the display device of one embodiment of the present invention in a display portion. The display device of one embodiment of the present invention can be easily increased in resolution and definition. Thus, the display device of one embodiment of the present invention can be used for a display portion of a variety of electronic devices.

The display device of one embodiment of the present invention can have high resolution, and thus can be favorably used for an electronic device including a relatively small display portion. Examples of such an electronic device include watch-type and bracelet-type information terminal devices (wearable devices) and wearable devices capable of being worn on a head, such as a VR device like a head-mounted display, a glasses-type AR device, and an MR (Mixed Reality) device.

The definition of the display device of one embodiment of the present invention is preferably as high as HD (number of pixels: 1280×720), FHD (number of pixels: 1920×1080), WQHD (number of pixels: 2560×1440), WQXGA (number of pixels: 2560×1600), 4K (number of pixels: 3840×2160), or 8K (number of pixels: 7680×4320). In particular, a definition of 4K, 8K, or higher is preferable. The pixel density (resolution) of the display device of one embodiment of the present invention is preferably higher than or equal to 100 ppi, further preferably higher than or equal to 300 ppi, still further preferably higher than or equal to 500 ppi, yet still further preferably higher than or equal to 1000 ppi, yet still further preferably higher than or equal to 2000 ppi, yet still further preferably higher than or equal to 3000 ppi, yet still further preferably higher than or equal to 5000 ppi, yet still further preferably higher than or equal to 7000 ppi. With the use of such a display device with one or both of high resolution and high definition, an electronic device for portable use or home use can have higher realistic sensation, sense of depth, and the like. There is no particular limitation on the screen ratio (aspect ratio) of the display device of one embodiment of the present invention. For example, the display device is compatible with a variety of screen ratios such as 1:1 (a square), 4:3, 16:9, and 16:10.

The electronic device in this embodiment may include a sensor (a sensor having a function of sensing, detecting, or measuring force, displacement, position, speed, acceleration, angular velocity, rotational frequency, distance, light, liquid, magnetism, temperature, a chemical substance, sound, time, hardness, electric field, current, voltage, power, radiation, flow rate, humidity, gradient, oscillation, a smell, or infrared rays).

The electronic device in this embodiment can have a variety of functions. For example, the electronic device can have a function of displaying a variety of information (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Examples of wearable devices capable of being worn on a head are described with reference to FIG. 22A to FIG. 22D. The wearable devices have at least one of a function of displaying AR contents, a function of displaying VR contents, a function of displaying SR (Substitutional Reality) contents, and a function of displaying MR contents. The electronic device having a function of displaying contents of at least one of AR, VR, SR, MR, and the like enables the user to feel a high sense of immersion.

Figure 22A:
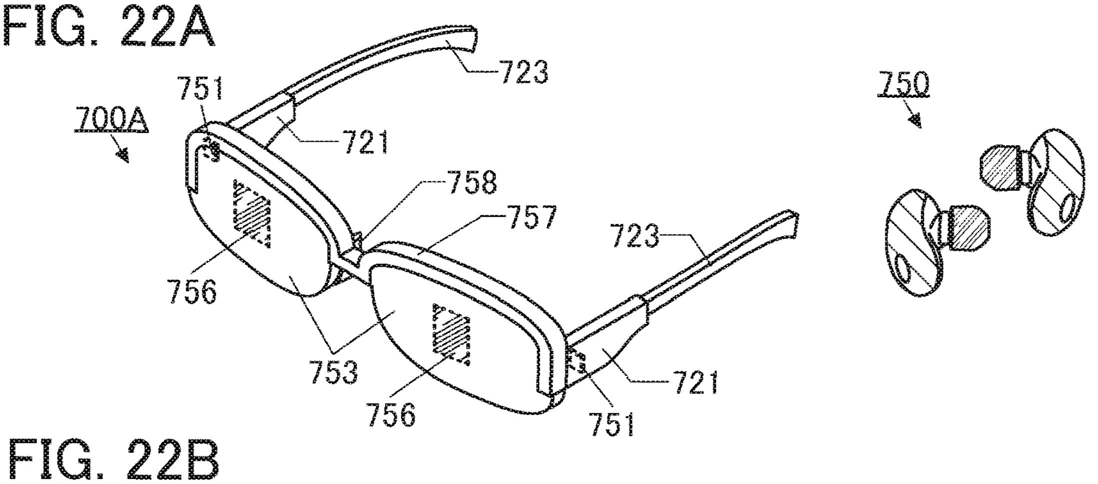
FIG. 22A to FIG. 22D are diagrams each illustrating an electronic device.
Figure 22B:
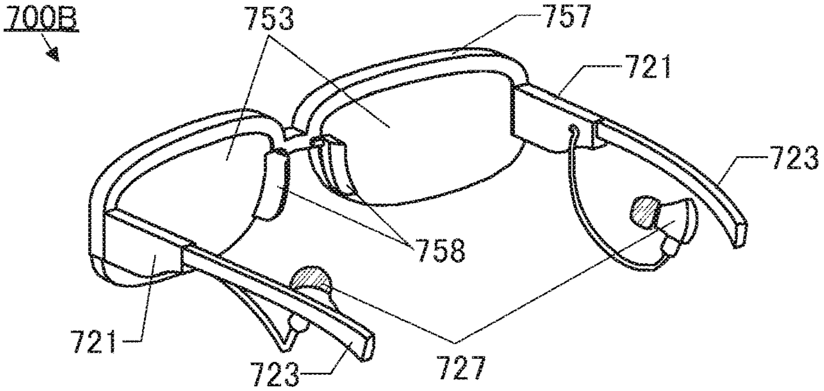

An electronic device 700A illustrated in FIG. 22A and an electronic device 700B illustrated in FIG. 22B each include a pair of display panels 751, a pair of housings 721, a communication portion (not illustrated), a pair of wearing portions 723, a control portion (not illustrated), an image capturing portion (not illustrated), a pair of optical members 753, a frame 757, and a pair of nose pads 758.

The display device of one embodiment of the present invention can be used as the display panel 751. Thus, the electronic devices are capable of performing ultrahigh-resolution display.

In the case where the display device includes a light-receiving device, the light-receiving device can capture an image of an eye and perform the iris authentication. In addition, the light-receiving device can perform eye tracking. With eye tracking, an object or location at which a user looks can be specified, so that selection of the functions of the electronic device, execution of software, and the like can be performed.

The electronic device 700A and the electronic device 700B can each project images displayed on the display panels 751 onto display regions 756 of the optical members 753. Since the optical members 753 have a light-transmitting property, a user can see images displayed on the display regions, which are superimposed on transmission images seen through the optical members 753. Accordingly, the electronic device 700A and the electronic device 700B are electronic devices capable of AR display.

In the electronic device 700A and the electronic device 700B, a camera capable of capturing images of the front side may be provided as the image capturing portion. Furthermore, when the electronic device 700A and the electronic device 700B are provided with an acceleration sensor such as a gyroscope sensor, the orientation of the user's head can be sensed and an image corresponding to the orientation can be displayed on the display regions 756.

The communication portion includes a wireless communication device, and a video signal and the like can be supplied by the wireless communication device. Instead of or in addition to the wireless communication device, a connector that can be connected to a cable for supplying a video signal and a power supply potential may be provided.

The electronic device 700A and the electronic device 700B are provided with a battery so that they can be charged wirelessly and/or by wire.

Figure 22C:
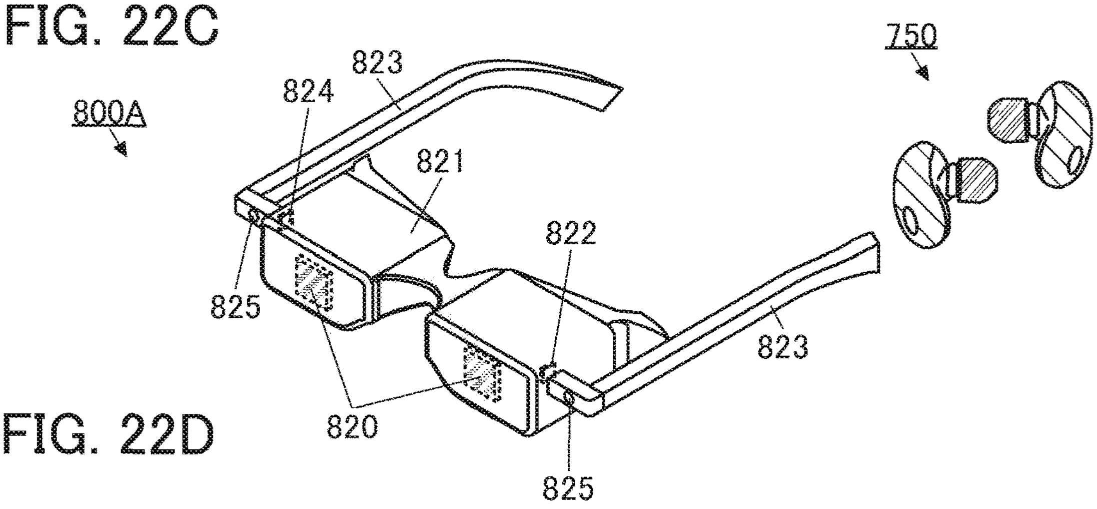
Figure 22D:
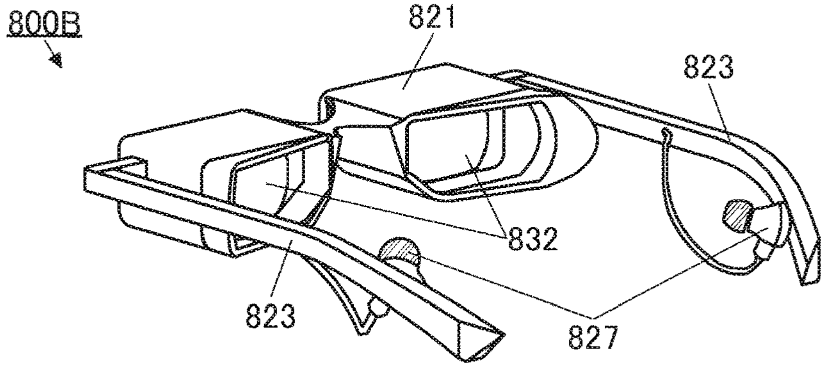

An electronic device 800A illustrated in FIG. 22C and an electronic device 800B illustrated in FIG. 22D each include a pair of display portions 820, a housing 821, a communication portion 822, a pair of wearing portions 823, a control portion 824, a pair of image capturing portions 825, and a pair of lenses 832.

The display device of one embodiment of the present invention can be used in the display portions 820. Thus, the electronic devices are capable of performing ultrahigh-resolution display. Such electronic devices can provide an enhanced sense of immersion to the user.

The display portions 820 are positioned inside the housing 821 so as to be seen through the lenses 832. When the pair of display portions 820 display different images, three-dimensional display using parallax can also be performed.

The electronic device 800A and the electronic device 800B can be regarded as electronic devices for VR. The user who wears the electronic device 800A or the electronic device 800B can see images displayed on the display portions 820 through the lenses 832.

The electronic device 800A and the electronic device 800B preferably include a mechanism for adjusting the lateral positions of the lenses 832 and the display portions 820 so that the lenses 832 and the display portions 820 are positioned optimally in accordance with the positions of the user's eyes. Moreover, the electronic device 800A and the electronic device 800B preferably include a mechanism for adjusting focus by changing the distance between the lenses 832 and the display portions 820.

The electronic device 800A or the electronic device 800B can be mounted on the user's head with the wearing portions 823. FIG. 22C or the like illustrates an example where the wearing portion 823 has a shape like a temple (also referred to as a joint or the like) of glasses; however, one embodiment of the present invention is not limited thereto. The wearing portions 823 can have any shape, for example, a shape of a helmet or a bands as long as the user can wear the electronic device.

An image capturing portion 825 has a function of obtaining external information. Data obtained by the image capturing portion 825 can be output to the display portion 820. An image sensor can be used for the image capturing portion 825. Moreover, a plurality of cameras may be provided so as to cover a plurality of angles of view, such as a telephoto angle of view and wide angle of view.

Although an example where the image capturing portions 825 are provided is shown here, a ranging sensor capable of measuring a distance between the user and an object (hereinafter also referred to as a sensing portion) just needs to be provided. In other words, the image capturing portion 825 is one embodiment of the sensing portion. As the sensing portion, an image sensor or a distance image sensor such as LiDAR (Light Detection and Ranging) can be used, for example. By using images obtained by the camera and images obtained by the distance image sensor, more information can be obtained and a gesture operation with higher accuracy is possible.

The electronic device 800A may include a vibration mechanism that functions as bone-conduction earphones. For example, any one or more of the display portion 820, the housing 821, and the wearing portion 823 can employ a structure including the vibration mechanism. Thus, without additionally requiring an audio device such as headphones, earphones, or a speaker, the user can enjoy video and sound only by wearing the electronic device 800A.

The electronic device 800A and the electronic device 800B may each include an input terminal. To the input terminal, a cable for supplying a video signal from a video output device or the like, power for charging the battery provided in the electronic device, and the like can be connected.

The electronic device of one embodiment of the present invention may have a function of performing wireless communication with earphones 750. The earphones 750 include a communication portion (not illustrated) and have a wireless communication function. The earphones 750 can receive information (e.g., sound data) from the electronic device with the wireless communication function. For example, the electronic device 700A in FIG. 22A has a function of transmitting information to the earphones 750 with the wireless communication function. As another example, the electronic device 800A in FIG. 22C has a function of transmitting information to the earphones 750 with the wireless communication function.

The electronic device may include an earphone portion. The electronic device 700B in FIG. 22B includes earphone portions 727. For example, the earphone portion 727 and the control portion can be connected to each other by wire. Part of a wiring that connects the earphone portion 727 and the control portion may be positioned inside the housing 721 or the wearing portion 723.

Similarly, the electronic device 800B in FIG. 22D includes earphone portions 827. For example, the earphone portion 827 and the control portion 824 can be connected to each other by wire. Part of a wiring that connects the earphone portion 827 and the control portion 824 may be positioned inside the housing 821 or the wearing portion 823. Alternatively, the earphone portions 827 and the wearing portions 823 may include magnets. This is preferable because the earphone portions 827 can be fixed to the wearing portions 823 with magnetic force and thus can be easily housed.

The electronic device may include an audio output terminal to which earphones, headphones, or the like can be connected. The electronic device may include one or both of an audio input terminal and an audio input mechanism. As the audio input mechanism, a sound collecting device such as a microphone can be used, for example. The electronic device may have a function of what is called a headset by including the audio input mechanism.

As described above, both the glasses-type device (e.g., the electronic device 700A and the electronic device 700B) and the goggles-type device (e.g., the electronic device 800A and the electronic device 800B) are preferable as the electronic device of one embodiment of the present invention.

The electronic device of one embodiment of the present invention can transmit information to earphones by wire or wirelessly.

The electronic device to which the display device of one embodiment of the present invention can be applied may be connected to an external server through a network. The processing needing high arithmetic capability may be performed in a server connected through a network instead of the electronic device. Such processing is also referred to as what is called thin client, and limited processing is executed in a terminal (here, an electronic device) on a user side (a client side), advanced processing such as application execution and management is executed on a server side, whereby the scale of processing in a terminal on a client-side can be reduced. Accordingly, the electronic device does not need an arithmetic device having high arithmetic performance, which facilitates reductions in cost, weight, and size. In the electronic device of one embodiment of the present invention, the above-described thin client and processing needing high arithmetic capability on the electronic device side may be performed in combination.

This embodiment can be implemented in an appropriate combination with the structures described in the other embodiments.

REFERENCE NUMERALS

DATAA: potential, DATAW: potential, PIX: pixel, SLO: slope potential, VB: potential, VER: potential, VRESW: potential, 10*a*: pixel, 10B: subpixel, 10*b*: pixel, 10G: subpixel, 10R: subpixel, 10: pixel, 11: pulse-signal-generation portion, 12: light-emitting control portion, 13: pixel array, 20*a*: first source driver, 20B: pixel, 20*b*: second source driver, 20G: pixel, 20R: pixel, 30: gate driver, 40: slope potential supply circuit, 50: slope potential generation circuit, 100A: display device, 100B: display device, 100E: display device, 100F: display device, 101: transistor, 102: transistor, 103: transistor, 104: transistor, 105: transistor, 106: transistor, 107: transistor, 108: transistor, 110B: light-emitting device, 110G: light-emitting device, 110R: light-emitting device, 110: light-emitting device, 111: capacitor, 112: capacitor, 113: semiconductor layer, 114: light-emitting layer, 115: semiconductor layer, 116: conductive layer, 117: insulating layer, 118: support layer, 121: wiring, 122: wiring, 123: wiring, 124: wiring, 125: wiring, 126: wiring, 127: wiring, 128: wiring, 129: wiring, 131: wiring, 132: wiring, 133: wiring, 134: wiring, 135: wiring, 140: transistor, 142: element isolation layer, 143: low-resistance region, 144: insulating layer, 145: conductive layer, 146: insulating layer, 147: conductive layer, 148: conductive layer, 149: insulating layer, 150: substrate, 151: insulating layer, 152: insulating layer, 160: transistor, 161: conductive layer, 162: insulating layer, 163: insulating layer, 164: insulating layer, 165: metal oxide layer, 166: conductive layer, 167: insulating layer, 168: conductive layer, 181: insulating layer, 182: insulating layer, 183: insulating layer, 184*a*: conductive layer, 184*b*: conductive layer, 185: insulating layer, 186: insulating layer, 187: insulating layer, 188: insulating layer, 189: insulating layer, 192: conductive layer, 195: conductive layer, 196: conductive layer, 197: conductive layer, 198: conductive layer, 199: conductive layer, 280: display module, 281: display portion, 282: circuit portion, 283*a*: pixel circuit, 283: pixel circuit portion, 284*a*: pixel, 284: pixel portion, 285: terminal portion, 286: wiring portion, 290: FPC, 291: substrate, 292: substrate, 310: layer, 311: Si transistor, 312: functional circuit, 320: layer, 321: OS transistor, 330: layer, 331: LED array, 340: layer, 350: light-blocking layer, 351: light-blocking layer, 360B: color conversion layer, 360G: color conversion layer, 360R: color conversion layer, 361B: coloring layer, 361G: coloring layer, 361R: coloring layer, 700A: electronic device, 700B: electronic device, 721: housing, 723: wearing portion, 727: earphone portion, 750: earphone, 751: display panel, 753: optical component, 756: display region, 757: frame, 758: nose pad, 800A: electronic device, 800B: electronic device, 820: display portion, 821: housing, 822: communication portion, 823: wearing portion, 824: control portion, 825: image capturing portion, 827: earphone portion, 832: lens

The invention claimed is:

1. A display device comprising:

a pixel, the pixel comprising:

a pulse-signal-generation portion; and a light-emitting control portion, wherein the light-emitting control portion comprises a first transistor, a second transistor, a third transistor, a capacitor, and a light-emitting device, wherein the pulse-signal-generation portion comprises a fourth transistor and a fifth transistor, wherein the light-emitting device emits light in accordance with a data potential charged in the light-emitting control portion, wherein the data potential is discharged in accordance with a pulse signal generated in the pulse-signal-generation portion, wherein a gate of the first transistor is electrically connected to one electrode of the capacitor, one of a source and a drain of the second transistor, and one of a source and a drain of the third transistor, wherein one of a source and a drain of the first transistor is electrically connected to one electrode of the light-emitting device and the other electrode of the capacitor, wherein a first data potential is supplied to the other of the source and the drain of the second transistor, wherein a gate of the third transistor is electrically connected to one of a source and a drain of the fourth transistor, wherein a gate of the fourth transistor is electrically connected to one of a source and a drain of the fifth transistor, wherein the other of the source and the drain of the fourth transistor is electrically connected to a first wiring, and wherein the other of the source and the drain of the fifth transistor is electrically connected to a second wiring supplying a second data potential.

2. The display device according to claim 1, wherein the light-emitting device is a micro LED.

3. An electronic device comprising:

the display device according to claim 1; and a camera.

4. The display device according to claim 1, wherein the light-emitting device is configured to be turned off, when the data potential is discharged.

5. A display device comprising:

a pixel, the pixel comprising:

a first transistor;

a second transistor;

a third transistor;

a fourth transistor;

a fifth transistor;

a sixth transistor;

a capacitor; and a light-emitting device, wherein a gate of the first transistor is electrically connected to one of a source and a drain of the second transistor, one of a source and a drain of the third transistor, and one electrode of the capacitor, wherein one of a source and a drain of the first transistor is electrically connected to one electrode of the light-emitting device and the other electrode of the capacitor, wherein a first data potential is charged in the gate of the first transistor through the second transistor, wherein one of a source and a drain of the fourth transistor is electrically connected to one of a source and a drain of the fifth transistor and a gate of the third transistor, wherein a gate of the fourth transistor is electrically connected to one of a source and a drain of the sixth transistor, wherein the other of the source and the drain of the fourth transistor is electrically connected to a first wiring, and wherein the other of the source and the drain of the sixth transistor is electrically connected to a second wiring supplying a second data potential.

6. The display device according to claim 5, wherein a slope-shaped signal potential is input to the fourth transistor, and wherein a reset potential is input to the fifth transistor.

7. The display device according to claim 5, wherein the light-emitting device is configured to emit light, when the first data potential is charged in the gate of the first transistor, and wherein the light-emitting device is configured to be turned off, when the first data potential charged in the gate of the first transistor is discharged.

8. A display device comprising:

a first transistor, a second transistor, a third transistor, a fourth transistor, a fifth transistor, and a sixth transistor;

a first capacitor;

a second capacitor; and a light-emitting device, wherein a gate of the first transistor is electrically connected to one of a source and a drain of the second transistor, one of a source and a drain of the third transistor, and one electrode of the first capacitor, wherein one of a source and a drain of the first transistor is electrically connected to one electrode of the light-emitting device and the other electrode of the first capacitor, wherein a first data potential is supplied to the other of the source and the drain of the second transistor, wherein a gate of the third transistor is electrically connected to one of a source and a drain of the fourth transistor and one of a source and a drain of the fifth transistor, wherein a gate of the fourth transistor is electrically connected to one of a source and a drain of the sixth transistor and one electrode of the second capacitor, wherein the other of the source and the drain of the fourth transistor is electrically connected to a first wiring supplying a slope signal, and wherein the other of the source and the drain of the sixth transistor is electrically connected to a second wiring supplying a second data potential.

9. The display device according to claim 8, further comprising a seventh transistor, wherein one of a source and a drain of the seventh transistor is electrically connected to one of the source and the drain of the first transistor.

10. The display device according to claim 9, wherein each of the first transistor, the second transistor, the third transistor, the fifth transistor, and the sixth transistor is an n-channel transistor, and wherein the fourth transistor is a p-channel transistor.

11. The display device according to claim 10, wherein each of the first transistor, the second transistor, the fifth transistor, and the sixth transistor comprises a metal oxide in a channel formation region, and wherein each of the third transistor and the fourth transistor comprises silicon in a channel formation region.

12. The display device according to claim 8, wherein each of the second transistor, the fourth transistor, and the sixth transistor is an n-channel transistor, and wherein each of the first transistor, the third transistor, and the fifth transistor is a p-channel transistor.

13. The display device according to claim 12, wherein each of the second transistor, the fourth transistor, and the sixth transistor comprises a metal oxide in a channel formation region, and wherein each of the first transistor, the third transistor, and the fifth transistor comprises silicon in a channel formation region.

* * * * *